US012620210B2

(12) United States Patent
Ba et al.

(10) Patent No.: US 12,620,210 B2
(45) Date of Patent: May 5, 2026

(54) MACHINE-LEARNING TECHNIQUES FOR DETECTING ARTIFACT PIXELS IN IMAGES

(71) Applicant: Ventana Medical Systems, Inc., Tucson, AZ (US)

(72) Inventors: Qinle Ba, San Mateo, CA (US); Jim F. Martin, Mountain View, CA (US); Karel J. Zuiderveld, Boulder, CO (US); Uwe Horchner, Woodside, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 281 days.

(21) Appl. No.: 18/610,209

(22) Filed: Mar. 19, 2024

(65) Prior Publication Data

US 2024/0233347 A1 Jul. 11, 2024

Related U.S. Application Data

(63) Continuation of application No. PCT/US2022/046096, filed on Oct. 7, 2022.
(Continued)

(51) Int. Cl.
*G06V 10/776* (2022.01)
*G06T 7/00* (2017.01)
(Continued)

(52) U.S. Cl.
CPC .......... *G06V 10/776* (2022.01); *G06T 7/0012* (2013.01); *G06V 10/7715* (2022.01);
(Continued)

(58) Field of Classification Search
None
See application file for complete search history.

(56) References Cited

U.S. PATENT DOCUMENTS 10,225,514 B2 * 3/2019 Leng ...................... H04N 7/015
2014/0226882 A1 * 8/2014 Collins ..................... G06T 7/33
382/128
(Continued)

FOREIGN PATENT DOCUMENTS

JP 2017510792 A 4/2017
JP 2021073566 A 5/2021
JP 2021518025 A 7/2021

OTHER PUBLICATIONS

Japanese Application No. 2024-521189, Notice of Allowance, Mailed on Jul. 25, 2025, 5 pages.
(Continued)

*Primary Examiner* — Haris Sabah
(74) *Attorney, Agent, or Firm* — Kilpatrick Townsend & Stockton LLP

(57) ABSTRACT

Method and systems for of using a machine-learning model to detect predicted artifacts at a target image resolution are provided. A machine-learning model trained to detect artifact pixels in images at a target image resolution is accessed. An image depicting at least part of the biological sample at an initial image resolution can be converted at the target image resolution. The machine-learning model is applied to the converted image to identify one or more artifact pixels from the converted image. Method and systems for training the machine-learning model to detect predicted artifacts at the target image resolution are also provided.

20 Claims, 25 Drawing Sheets
(16 of 25 Drawing Sheet(s) Filed in Color)

Related U.S. Application Data

(60) Provisional application No. 63/256,328, filed on Oct. 15, 2021.

(51) Int. Cl.
| | |
|---|---|
| *G06V 10/77* | (2022.01) |
| *G06V 10/774* | (2022.01) |
| *G06V 20/69* | (2022.01) |
| *G06V 20/70* | (2022.01) |

(52) U.S. Cl.
CPC .......... *G06V 10/774* (2022.01); *G06V 20/695* (2022.01); *G06V 20/70* (2022.01); *G06T 2207/10024* (2013.01); *G06T 2207/20081* (2013.01); *G06T 2207/20084* (2013.01); *G06T 2207/30004* (2013.01); *G06V 20/698* (2022.01); *G06V 2201/03* (2022.01)

(56) References Cited

U.S. PATENT DOCUMENTS

| | | | | |
|---|---|---|---|---|
| 2018/0182099 A1* | 6/2018 | Lesniak | .............. | G06V 10/993 |
| 2019/0286880 A1* | 9/2019 | Jackson | ................ | G16H 30/40 |
| 2022/0215553 A1* | 7/2022 | Oakley | ............... | A61B 5/7203 |

OTHER PUBLICATIONS

JP Application No. 2024-521189, "Office Action", Mar. 7, 2025, 12 pages.
International Application No. PCT/US2022/046096 , "International Search Report and the Written Opinion", Mar. 14, 2023, 13 pages.
International Application No. PCT/US2022/046096 , "Invitation to Pay Additional Fees and, Where Applicable, Protest Fee", Jan. 18, 2023, 3 pages.
Rostami et al., "Neural Network for Enhancement of FCM based Brain MRI Segmentation", 13th Iranian Conference on Fuzzy Systems (IFSC), 2013, pp. 1-4.

\* cited by examiner

100
104
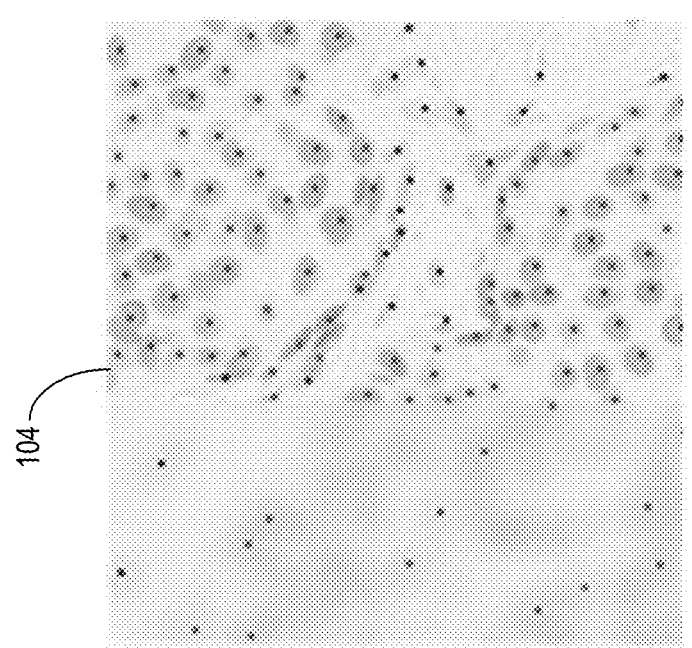
102
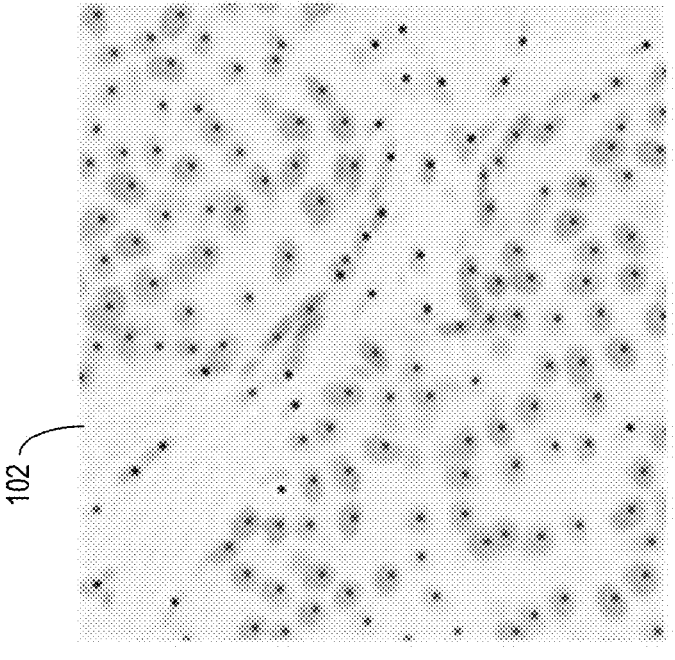
*FIG. 1*

200

202

1. Problem analysis

204

Q1: Legacy models or labels for a similar purpose and from a similar domain?

208

Q2: Can be partially solved by image processing?

No

No

Yes

Yes

206

2. Inferencing; domain-adaptation

210

3. Generate Initial GT

212

4.2 Generate GT interactively

214

4.1 Correct GT interactively

216

5. Active-learning; transfer learning; few-shot learning; domain-adaptation

Iteratively generating more GT

FOV

702

Tissue fold mask

Not tissue fold

Tissue fold

Identify FOVs with tissue folds from additional Mosaic WSIs

708

Identify FOVs with tissue folds from blur

Generate binary tissue fold masks with a DL-based interactive GUI

710

Identify FOVs with tissue folds from GT

706

900

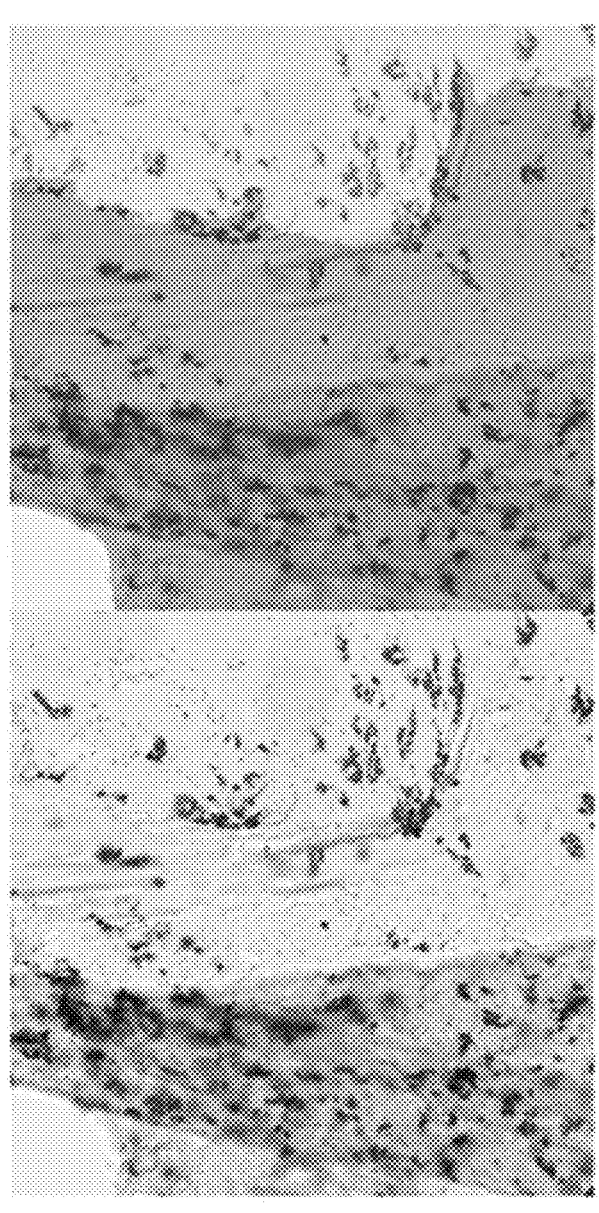
Analyzable tissue
Non-analysis tissue
Transparent: non-tissue
*FIG. 11*

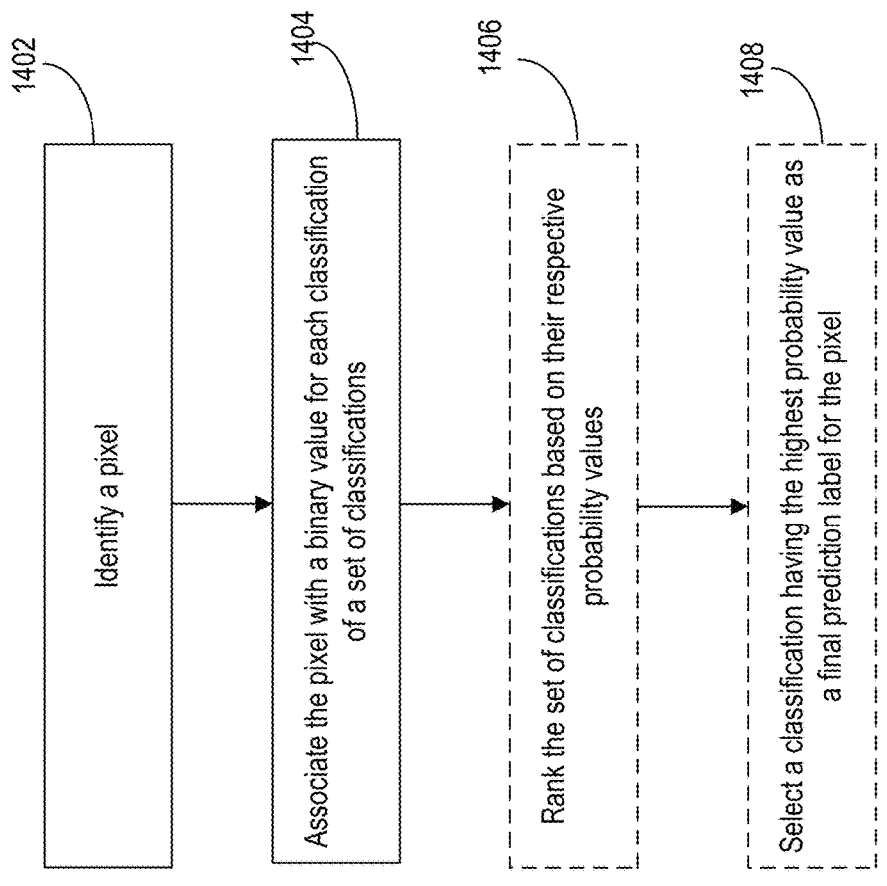
1400
1402
Identify a pixel
1404
Associate the pixel with a binary value for each classification
of a set of classifications
1406
Rank the set of classifications based on their respective
probability values
1408
Select a classification having the highest probability value as
a final prediction label for the pixel
*FIG. 14*

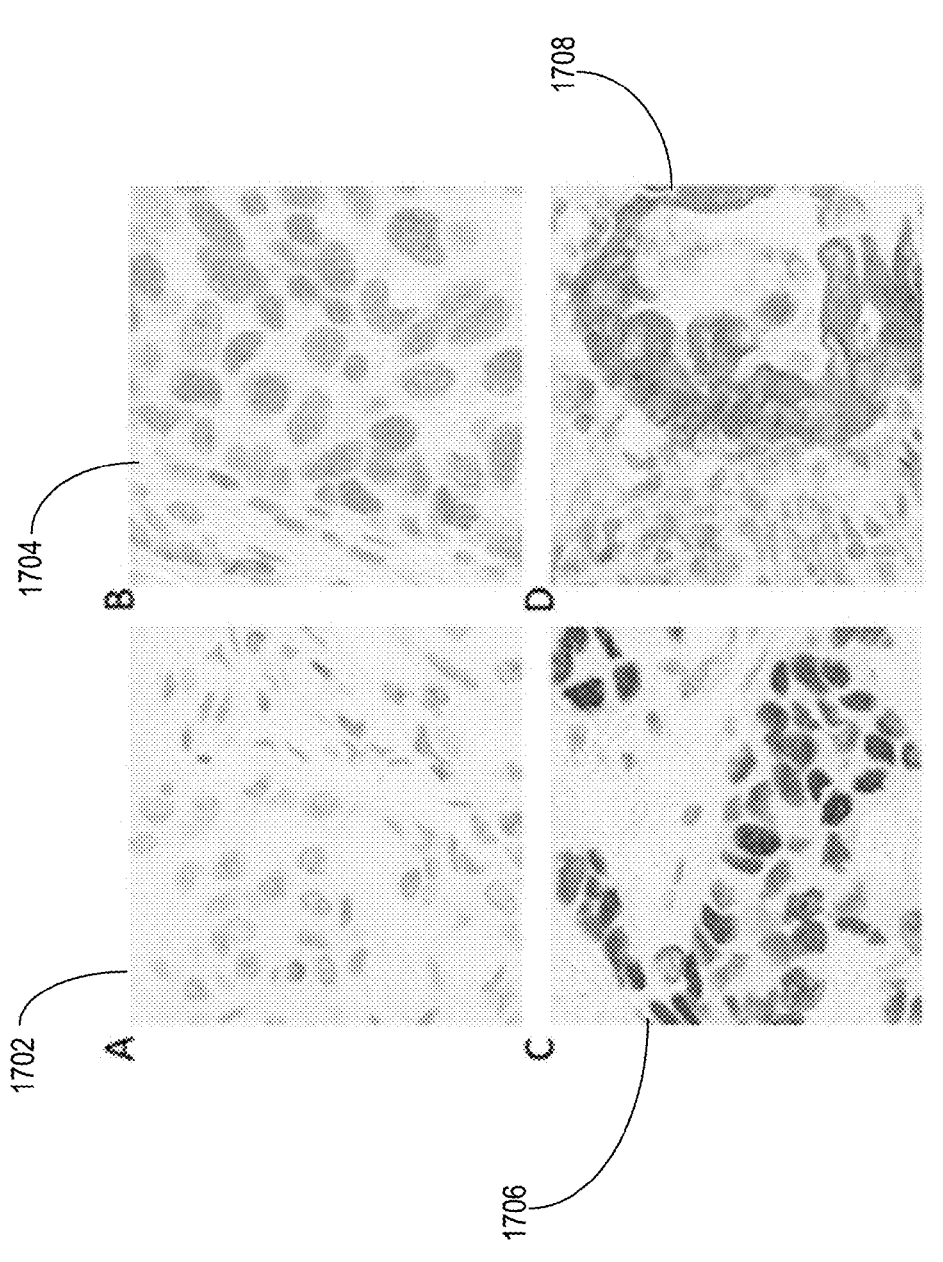
FIG. 17

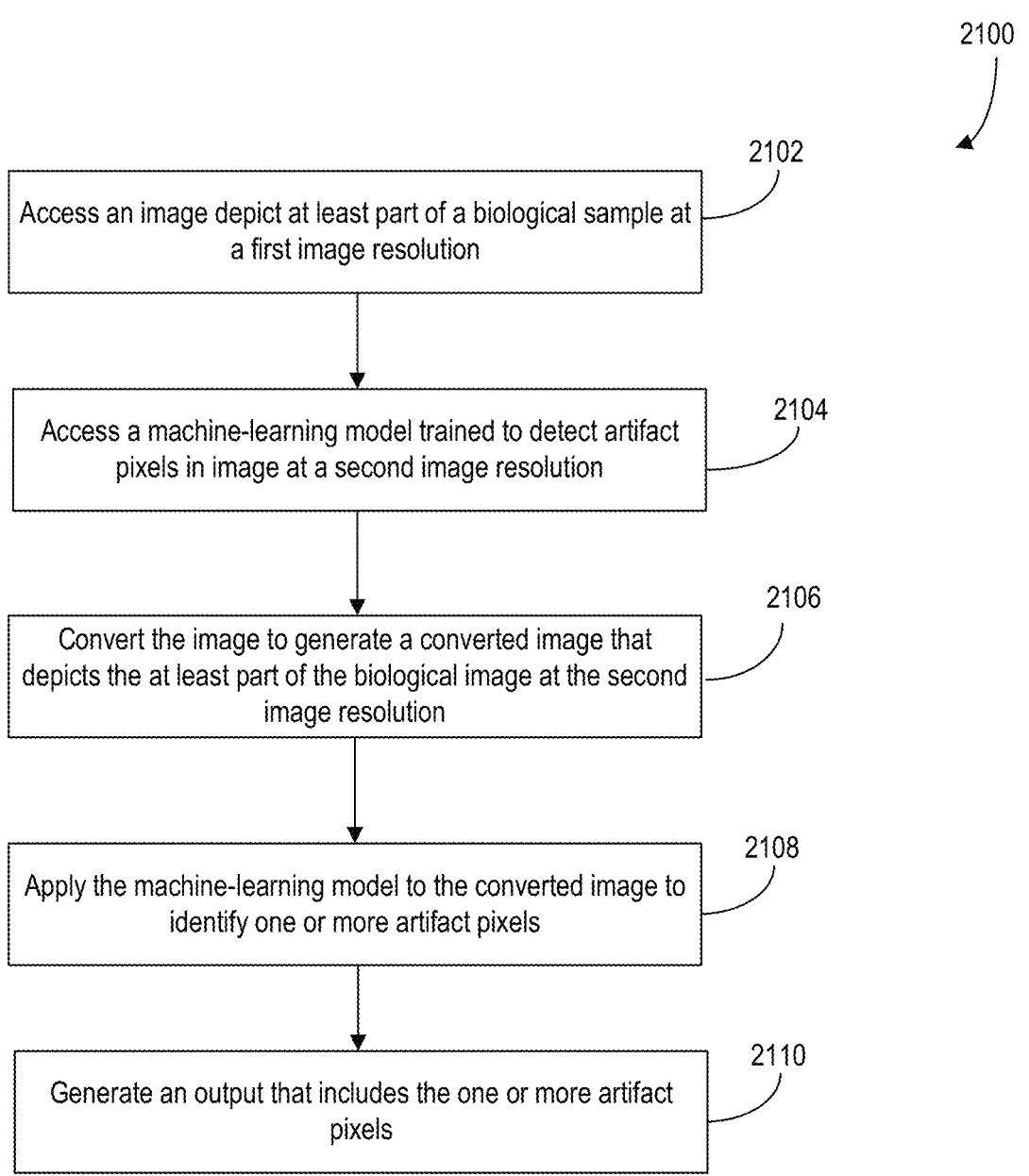

2100

2102
Access an image depict at least part of a biological sample at a first image resolution 2104
Access a machine-learning model trained to detect artifact pixels in image at a second image resolution 2106
Convert the image to generate a converted image that depicts the at least part of the biological image at the second image resolution 2108
Apply the machine-learning model to the converted image to identify one or more artifact pixels 2110
Generate an output that includes the one or more artifact pixels

FIG. 21

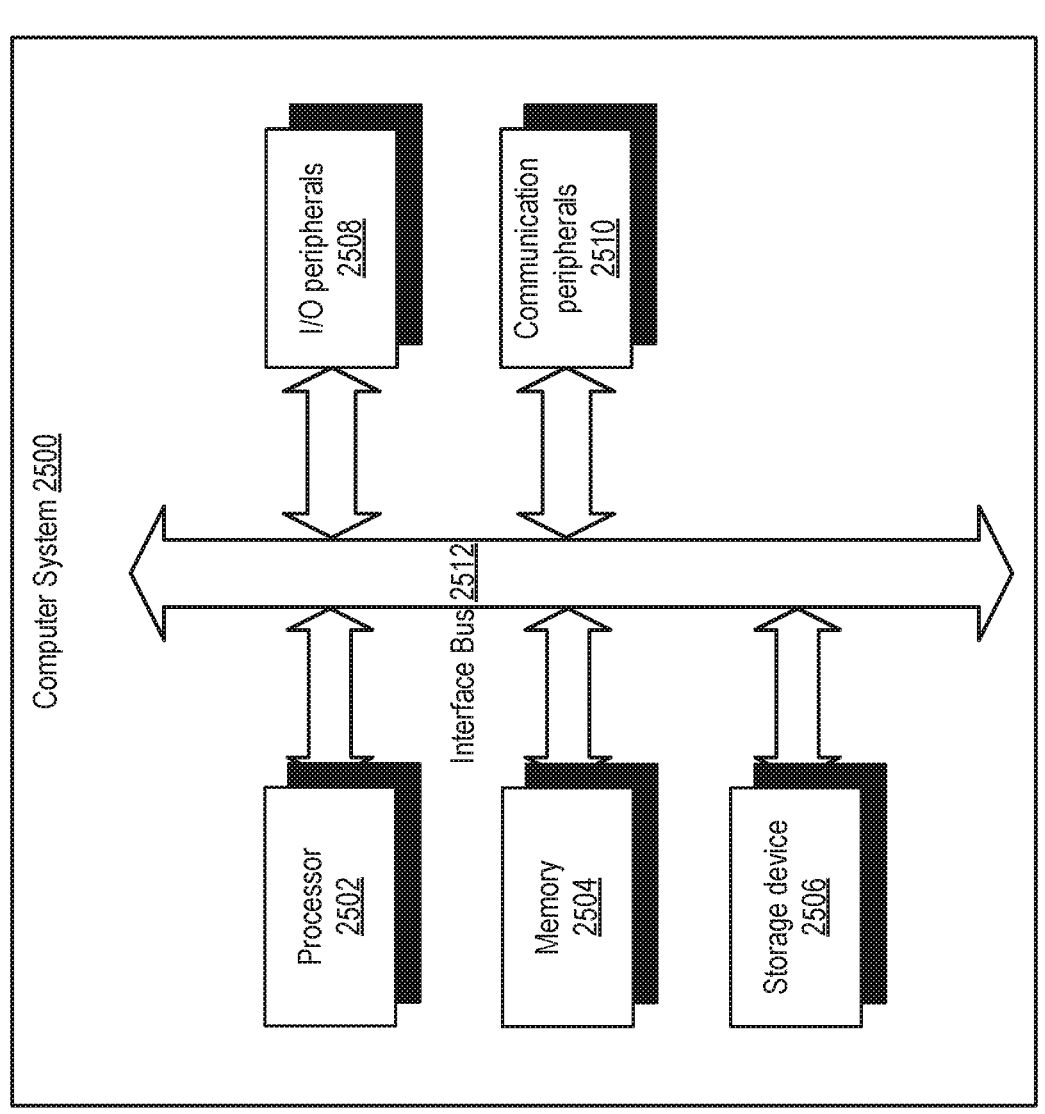
*FIG. 25*

MACHINE-LEARNING TECHNIQUES FOR DETECTING ARTIFACT PIXELS IN IMAGES

CROSS-REFERENCES TO RELATED APPLICATIONS

This application is a continuation of International Application No. PCT/US2022/046096, filed on Oct. 7, 2022, which claims priority to U.S. Provisional Patent Application No. 63/256,328, entitled "Machine-Learning Techniques For Detecting Artifact Pixels In Images," filed on Oct. 15, 2021, each of which are hereby incorporated by reference in their entirety for all purposes.

BACKGROUND OF THE INVENTION

Immunohistochemistry (IHC) assays enable the visualization and quantification of biomarker location, which play a critical role in both cancer diagnostics and oncology research. In addition to the "gold-standard" DAB (3,3'-diaminobenzidine)-based IHC assays, recent years have seen advances in both brightfield multiplex IHC assays and multiple fluorescent IHC assays. These multiplex IHC assays can be used to, among others, identify multiple biomarkers in the same slide image. Such assays not only improve efficiency in identifying biomarkers in a single slide, but also facilitate the identification of additional properties associated with such biomarkers (e.g., co-localized biomarkers).

Quality control of slide images can be performed to improve performance and reduce errors in digital pathology analyses. In particular, quality control allows the digital pathology analyses to accurately detect diagnostic or prognostic biomarkers from the slide images. Quality control may include, among others, detecting and excluding pixels of the slide images that are predicted to depict one or more image artifacts. The artifacts can include tissue folds, foreign objects, blurry image portions, and any other distortions that prevent an accurate depiction of a corresponding region of the biological sample. For example, a tissue fold present at the biological sample may cause one or more portions of the image to be blurry. These artifacts can likely contribute to errors or inaccurate results in subsequent digital pathology analyses. For example, artifacts detected in a slide image can result in the digital pathology analysis miscounting the number of detected cells, misidentifying a set of tumor cells as being normal, etc. In effect, the artifacts can contribute to an inaccurate diagnosis for a subject associated with the slide image.

SUMMARY

In some embodiments, a method of generating training data for training a machine-learning model to detect predicted artifacts in an image is provided. The method can include accessing an image depicting at least part of a biological sample. The method can also include applying an image pre-processing algorithm to the image to generate a pre-processed image. In some instances, the pre-processed image includes a plurality of labeled pixels. Each labeled pixel of the plurality of labeled pixels can be associated with a label predicting whether the pixel accurately depicts a corresponding point or region of the at least part of the biological sample.

The method can also include applying a machine-learning model to the pre-processed image to identify one or more labeled pixels from the plurality of labeled pixels. In some instances, the one or more labeled pixels are predicted to have been erroneously labeled by the image pre-processing algorithm. The method can also include modifying a label of each of the one or more labeled pixels. The method can also include generating a training image that includes at least the one or more labeled pixels with the modified labels. The method can also include outputting the training image.

In some embodiments, a method of training a machine-learning model to detect predicted artifacts in an image at a target image resolution is provided. The method can include accessing a training image depicting at least part of a biological sample. In some instances, the training image includes a plurality of labeled pixels, in which each labeled pixel of the plurality of labeled pixels is associated with a label predicting whether the pixel accurately depicts a corresponding point or region of the at least part of the biological sample.

The method can also include accessing a machine-learning model that includes a set of convolutional layers. In some instances, the machine-learning model is configured to apply each convolutional layer of the set of convolutional layers to a feature map representing an input image. The method can also include training the machine-learning model to detect one or more artifact pixels in images at a target image resolution. In some instances, an artifact pixel of the one or more artifact pixels is predicted to not accurately depict a point or region of the at least part of the biological sample.

In some instances, the training includes, for each labeled pixel of the plurality of labeled pixels of the training image: (i) determining a first loss of the labeled pixel at the first image resolution by applying a first convolution layer of the set of convolutional layers to a first feature map representing the training image at a first image resolution; (ii) determining a second loss of the labeled pixel at the second image resolution by applying a second convolution layer of the set of convolutional layers to a second feature map representing the training image at a second image resolution, where the second resolution has a higher image resolution relative to the first image resolution; (iii) determining a total loss for the labeled pixel based on the first loss and the second loss; and (iv) determining, based on the total loss, that the machine-learning model has been trained to detect the one or more artifact pixels at the target image resolution. The method can also include outputting the trained machine-learning model.

In some embodiments, a method of using a machine-learning model to detect predicted artifacts at a target image resolution is provided. The method can include accessing an image depicting at least part of a biological sample, in which the image is at a first image resolution. The method can also include accessing a machine-learning model trained to detect artifact pixels in images at a second image resolution. In some instances, the first image resolution has a higher image resolution relative to the second image resolution.

The method can also include converting the image to generate a converted image that depicts the at least part of the biological sample at the second image resolution. The method can also include applying the machine-learning model to the converted image to identify one or more artifact pixels from the converted image. In some instances, an artifact pixel of the one or more artifact pixels is predicted to not accurately depict a point or region of the at least part of the biological sample. The method can also include generating an output that includes the one or more artifact pixels.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by some embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 1 shows a set of example images that include artifact pixels.

FIG. 2 shows a flowchart illustrating an example process for generating training data, according to some embodiments.

FIG. 11 shows an example artifact mask generated using a combined artifact classification technique, according to some embodiments.

FIG. 14 shows a process for identifying a classification label for a pixel associated with both blurred and tissue fold regions, according to some embodiments.

FIG. 17 shows an example set of images, in which each image has been stained using a staining protocol corresponding to a particular type of IHC assay.

FIG. 21 shows a flowchart illustrating an example process for using a trained machine-learning model to accurately detect artifact pixels, according to some embodiments.

FIG. 25 illustrates an example of a computer system for implementing some of some embodiments disclosed herein.

DETAILED DESCRIPTION

I. Overview

Figure 3:
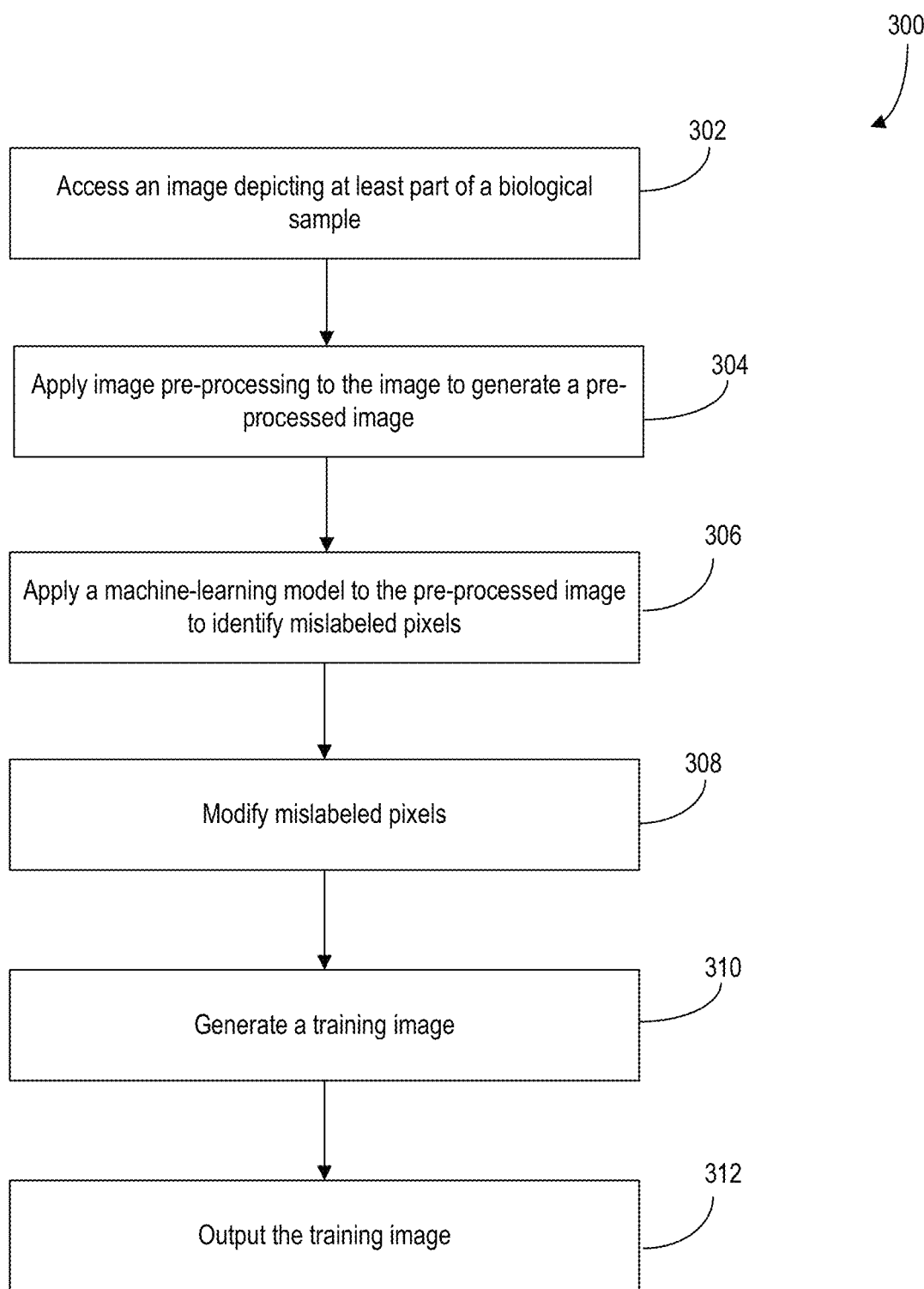
FIG. 3 shows a flowchart illustrating an example process for using machine-learning models for generating training data, according to some embodiments.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Several techniques for detecting artifacts have been used for quality control of the slide images. An example technique can include observing a given image and manually identifying a set of pixels within the image that are predicted to depict one or more artifacts. Manual identification of artifacts, however, can be time-consuming. The manual process heavily relies on experts to review each image to accurately determine whether the images include artifacts. Moreover, classification of certain types of artifacts can be subjective and differ on expert-by-expert basis. For example, a first expert can label a set of pixels of a slide image as representing a blurry tissue region, whereas a second expert can label the same set of pixels of the same slide image as a non-blurry tissue region. Such potential discrepancy in identifying artifacts can reduce accuracy in subsequent digital pathology analyses.

As an alternative to manual identification, machine-learning models can predict which pixels depict artifacts. These machine-learning models have succeeded in detecting certain types of artifacts, but their accuracy has been constrained due to several factors. For example, the factors can be attributed to existing training techniques: (1) not being able to efficiently generate accurate training data; (2) not being able to efficiently train a machine-learning model to accurately detect artifacts in images with various staining patterns; and (3) not being able to incorporate an artifact-detection machine-learning model to subsequent digital pathology analyses (e.g., a cell classification model, image-segmentation techniques) while keeping increases in processing time and consumption of computing resources to a minimum. In effect, the existing machine-learning models typically require significant computing resources and processing time for training and testing. Further, using the existing machine-learning models for detecting artifacts can significantly increase processing time and consume a large amount of computing resources for subsequent digital pathology analyses (e.g., cell classification). As described below in detail, embodiments of the present application can address each of the three factors to optimize performance and increase efficiency of detecting artifacts.

A. Generating Training Data

A first factor that may compromise accurate artifact-detection by a machine-learning model includes existing training techniques not being able to efficiently generate accurate training data. Existing techniques can include manually annotating a set of pixels in the image that may not accurately depict a corresponding portion of the biological sample. However, manually annotating artifacts in slide images can be time-consuming. This issue can be compounded when the machine-learning model requires a large amount of training data to achieve acceptable performance levels.

In addition to the above, manual annotation may result in inconsistent training data. Generally, several experts are involved in manual annotating images for generating the training data. As described above, a perspective of each expert can differ on how a given set of pixels within an image can be considered as blurry, especially when the image includes pixels with varying levels of blurriness. For a particular set of pixels of an image, annotations from a first expert (e.g., non-blurry pixels) can be opposite from those from a second expert (e.g., blurry pixels). Such difference in perspectives can produce inconsistency within the training data. The inconsistency can result in the machine-learning model being trained to perform at less than optimal accuracy levels. Accordingly, there is a need for generating consistent and accurate training data, while reducing time for generating them.

To address the above challenges, some embodiments uses a technique for generating a label for each pixel of the image, where the label identifies whether the pixel accurately depicts a corresponding point or region of the (e.g., stained) biological sample. The labels can be subsequently used as training data for training a machine-learning model. In some instances, the label identifies whether a pixel depicts at least part of a blurred image portion of the image. The pixel associated a "blurred" label can be determined by estimating an amount of blurriness of the pixel and comparing the estimated amount with a blur threshold. As used herein, the term "blur threshold" corresponds to a blurriness level that is predicted to result in performance degradation of the classification model beyond a tolerance threshold. If the estimated amount exceeds the blur threshold, the label can indicate that the corresponding pixel does not accurately depict a corresponding point or region of the biological sample. In some instances, the blur threshold is determined by performing the digital pathology analysis of other images at a particular blurriness level, determining that outputs of the digital pathology analysis produce results below a tolerance threshold (e.g., an amount of pixels that were erroneously classified), and setting the particular blurriness level as the blur threshold.

The technique can include a use of an image pre-processing algorithm for generating an initial set of labels and a machine-learning model to modify the initial set of labels. For example, image blur detection can be applied to an image to generate a pre-processed image. The pre-processed image can identify an initial label for each pixel of the image. The machine-learning model can be applied to the pre-processed image to modify each label of a set of pixels that have been erroneously labeled. The image with the set of pixels with modified labels can be used as a training image for training a model for detecting artifacts in images.

B. Training a Machine-Learning Model to Accurately Detect Artifact Pixels

A second factor that may compromise accurate artifact-detection of a machine-learning model corresponds to existing training techniques not being able to efficiently train a machine-learning model to detect artifacts in images with various staining patterns. In particular, multiple stains corresponding to a particular type of IHC assay (e.g., Ki67 IHC assay) can be applied to a tissue sample to determine a particular diagnosis or prognosis of a subject. The image depicting such tissue sample may show distinct staining patterns.

Recent development of IHC-assay technology has facilitated multiple biomarkers being detected in a single image. For example, fluorescent-based IHC assays can use multispectral imaging to unmix several different fluorescent spectra, which may enable accurate identification of multiple antigens on the same tissue section. These multiplex IHC assays, however, can result in more complex staining patterns relative to singleplex IHC assays (e.g. IHC assays targeting a single type of antigen). However, training a single machine-learning model to detect artifacts across images with complex staining patterns can be difficult, especially when various types of IHC assays are taken into account. Existing techniques can include training the machine-learning model with a first set of training images that correspond to a first type of assay then with a second set of training images that correspond to a second type of assay. In some instances, a machine-learning model is trained with a set of training images collected from several IHC assays under study. These techniques can lead to a time-consuming labeling process and training process. Accordingly, there is a need for efficiently training the machine-learning model to detect artifacts in images with various staining patterns.

To address the above challenges, some embodiments include a technique for training a machine-learning model to detect artifacts in images with various staining patterns. The technique can include accessing a training image depicting at least part of a biological sample. The training image includes a plurality of labeled pixels, in which each pixel is associated with a label. The label predicts whether the pixel accurately depicts a corresponding point or region of the at least part of the biological sample. For example, a pixel depicting an out-of-focus region of the biological sample can be labeled as not accurately depicting the corresponding region.

In some instances, the training image is converted into a greyscale image. The greyscale image is used to train a machine-learning to detect artifact pixels. As used herein, an "artifact pixel" refers to a pixel that is predicted to not accurately depict a corresponding point or region of the at least part of the biological sample. In some instances, the artifact pixel is predicted to depict at least part of an artifact. For example, the artifact pixel can be predicted to depict a part of a blurry portion of a given image or depict a part of a foreign object (e.g., hair, dust particle, fingerprints) shown in the image. Additionally or alternatively, the training image is converted to the pre-processed image by transforming its pixels from a first color space (e.g., RGB) into a second color space (e.g., L*a*b). A first color channel in the second color space (e.g., L channel) can be extracted and used to train the machine-learning model to detect the artifact pixels.

In some instances, a set of image features can be added to the training image to train the machine-learning model. For example, the set of image features can include a matrix of image-gradient values. The matrix of image-gradient values can identify, for each pixel of the training image, an image gradient value of the pixel. An image-gradient value indicates whether the corresponding pixel corresponds to an edge of an image object. In some instances, the matrix of image-gradient values is determined by applying Laplacian of Gaussian (LoG) filters to the training image.

The machine-learning model can include a set of convolutional layers. Each convolutional layer can be configured to include one or more filters (alternatively referred to as "kernel"). For each pixel, a loss based on a comparison between the output of the set of convolutional layers and a value representing the label of the pixel can be backpropagated to modify parameters of respective filters of the set of convolutional layers.

In some instances, the machine-learning model includes or corresponds to a machine-learning model that includes a contracting path and an expansive path. For example, the machine-learning model can include or may be a U-Net machine-learning model. The contracting path can include a first set of processing blocks, in which each processing block corresponds to processing the training image at a corresponding image resolution. For example, a processing block can include applying two 3×3 convolutions (unpadded convolutions) to an input (e.g., the training image), in which each convolution is followed by a rectified linear unit (ReLU). The output of the processing block can thus include a feature map of the training image at a corresponding image resolution. The processing block also includes a 2×2 max pooling operation with stride 2 for downsampling the feature map of the processing block to a subsequent processing block which can repeat the above steps at a lower image resolution. At each downsampling step, the number of feature channels can be doubled.

Following the contracting path, the expansive path includes a second set of processing blocks, in which each processing block corresponds to processing the feature map outputted from the contracting path at a corresponding image resolution. For example, a processing block of the second set of processing blocks receives a feature map from the previous processing block, applies a 2×2 convolution ("up-convolution") that halves the number of feature channels, and concatenates the feature map with a cropped feature map from a corresponding processing block of the contracting path. The processing block can then apply two 3×3 convolutions to the concatenated feature map, each convolution followed by a ReLU. The output of the processing block includes a feature map at a corresponding image resolution, which can then be used as input for a subsequent processing block at a higher image resolution. The processing blocks can be applied until a final output is generated. The final output can include an image mask. The image mask can identify a set of artifact pixels, in which each artifact pixel is predicted to not accurately depict a point or region of the at least part of the biological sample.

In some instances, a loss at each processing block of the second set of processing blocks is calculated, which can be used to determine a total loss for the U-Net machine-learning model. For example, the total loss can correspond to a sum of the losses generated from each of the second set of processing blocks. The total loss for the U-Net machine-learning model can then be used to learn parameters of the U-Net machine-learning model (e.g., parameters of one or more filters of a convolutional layer). In some instances, a loss for each processing block of the second set of processing blocks can be determined by applying a 1×1 convolution layer to the feature map outputted by the processing block to generate a modified feature map and determine the loss from the modified feature map.

Additionally or alternatively, a set of machine-learning models can be trained, in which each machine-learning model of the set can be trained at a particular image resolution. The set of machine-learning models can be used to determine a target image resolution for detecting artifact pixels in a slide image. In some instances, the output from the trained machine-learning model at a lower image resolution is compared with the set of labels of the training image at a higher image resolution to determine a minimized loss. If the minimized loss can indicate that the output can detect artifact pixels within accuracy tolerance levels, the machine-learning model can be deployed for detecting artifact pixels in an image at the lower image resolution. For example, if the machine-learning model can be trained to detect artifact pixels within the tolerance levels of accuracy at 5×. Then, it is not necessary to deploy the machine-learning models at a higher image resolution than 5× (e.g., 10×, 20×, 40×). In this manner, inference time for artifact detection can be reduced by 16-fold relative to another machine-learning model processing images at 20× the original image resolution.

C. Implementing Machine-Learning Models to Detect Artifact Pixels in Images

A third factor that may compromise accurate artifact-detection of a machine-learning model corresponds to existing training techniques not being able to incorporate machine-learning models for detecting artifacts to subsequent digital pathology analyses while keeping increase of processing time and consumption of computing resources to a minimum. In particular, existing digital pathology analyses for detecting objects of interest (e.g., tissue, tumor, lympho-cytes) in a given whole-slide image can include dividing the whole-slide image into a set of smaller image tiles. For each image tile of the set of image tiles, the analysis can be performed on the image tile to determine a classification of each image object appearing in the image tile. Incorporating artifact detection into such digital pathology analyses may then include, for each image tile of the set of image tiles of an image: (i) applying a machine-learning model to detect artifact pixels in the image tile; (ii) excluding the detected artifact pixels from the image tile; and (iii) performing the digital pathology analysis (e.g., an image-segmentation algorithm) to classify image objects depicted in the image tile that excludes the artifact pixels. By applying multiple algorithms for each image tile, digital pathology of images with artifact-pixel detection may experience increased pro-cessing time and consume additional computer resources. This may lead to overall inefficiencies in digital pathology analyses.

Moreover, digital pathology analyses can require images scanned at high image resolution to achieve accurate results. For example, for detection of tumor biomarkers in an image, a machine-learning model used in the digital pathology analysis may require an image to be scanned at 20× or 40× of the original image resolution. Thus, detecting tumor biomarkers can be already resource-intensive and time-consuming. If the machine-learning model for detecting artifact pixels require the same image resolution, processing time for detecting the tumor biomarkers can further increase. Accordingly, there is a need for incorporating artifact-detection machine-learning model to digital pathology analyses to limit increases in processing time and consump-tion of computing resources at an acceptable level.

To address the above challenges, some embodiments include a technique for using different image resolutions for detecting artifact pixels in an image. In some instances, the artifact pixels are predicted to depict a part of an artifact. The artifact pixels can be detected either during scanning of a slide and/or after a digital image of the slide is generated. In some embodiments, a machine-learning model is trained to generate an image mask that includes a set of pixels of an image. The set of pixels of the image mask indicate artifact pixels, in which an artifact pixel is predicted to not accu-rately depict a point or region of the at least part of the biological sample. The machine-learning model is further trained to process the image at a particular image resolution to generate the image mask. In some instances, an image having a higher image resolution is then converted to a lower image resolution, at which the machine-learning model is applied to the converted image to generate the image mask. Additionally or alternatively, the machine-learning model can be further trained to identify an amount of artifact pixels (e.g., a percentage of artifact pixels to a total number of pixels in the image). For example, the estimated amount may include a count of predicted artifact pixels, a cumula-tive area corresponding to multiple or all artifact pixels, a percentage of a slide area or tissue area that corresponds to predicted artifact pixels, etc.

In some instances, the image is divided into a set of image tiles. The machine-learning model can be applied to each image tile of the set of image tiles to generate the image mask. The image mask identifies a subset of image tiles, in which each image tile of the subset of image tiles can depict one or more artifact pixels. The image mask can then be applied to the image to allow the user to unselect one or more image tiles of the subset of image tiles, at which the unselected image tiles are excluded from further digital pathology analysis. Additionally or alternatively, the image mask can be applied to the image, at which the subset of image tiles of the image are selected without user input and then excluded from further digital pathology analysis.

The trained machine-learning model can be applied to an image at a particular time point to generate the image mask. For example, the machine-learning model can be applied to an existing scanned image to generate the image mask. In another example, the machine-learning model can be applied while the image is being captured by a scanning device. Additionally or alternatively, a preview image (e.g., a thumbnail image) can be initially captured by the scanning device. An image pre-processing algorithm such as a blur detection algorithm can be applied to the preview image. If tissue regions are detected in the preview image, an initial image depicting the biological sample can be scanned. The initial image can depict the biological sample at the target image resolution.

The machine-learning model can be applied to the initial image to generate an image mask identifying the predicted artifact pixels and identify an amount of artifact pixels present in the image. If the amount of artifact pixels exceeds an image-area threshold, an alert can be generated to indi-cate that the image is unlikely to generate accurate results when subsequent digital pathology analysis is performed. In some instances, the artifact-area threshold corresponds to a value that represents a relative size of an image portion (e.g., 40%, 50%, 60%, 70%, 80%, 90%) within the image. If the amount of artifact pixels exceeds the artifact-area threshold, it can be predicted that one or more artifacts occupy a large portion within the image, thus likely causing performance degradation of subsequent digital pathology analyses (e.g., cell-classification). At such time, the image can be rejected (e.g., automatically or in response to receiving a user input corresponding to an instruction to reject the image) and/or the biological sample can be rescanned to capture another image. In some instances, the image mask is overlaid on the image to show the image with the predicted artifact pixels on a user interface. Additionally or alternatively, the application of the machine-learning model and generation of the alert can be performed for each image tile of a set of image tiles that form the image. In such manner, the decision to rescan the biological sample (for example) can occur before the entire image is scanned, thus saving additional processing time and reduce the use of computing resources.

II. Generating Training Data for Training Machine-Learning Models to Detect Artifact Pixels To improve digital pathology to accurately detect diag-nostic or prognostic biomarkers from slide images, quality control can be performed to detect and exclude artifacts from the slide images. The artifacts can include tissue folds, foreign objects, blurry image portions, and any other image distortions. FIG. 1 shows a set of example images 100 that include artifact pixels. As shown in FIG. 1, an example image 102 show a biological sample with acceptable focus quality, in which cell phenotype classification results are overlaid and showed as dots. Red dots correspond to posi-tively stained cells. Black dots correspond to negatively stained cells. In contrast, an example image 104 shows the same image as the image 102, but with a set of artifact pixels on the left side. A reduced number of red dots in the example image 104 indicate that cell phenotype classification model was unable to identify all positive stained cells that are present in the biological sample. Due to the artifact pixels, the cell phenotype classification model was unable to perform its corresponding digital pathology analysis. Although the example images shown in FIG. 1 clearly show pixels that depict a blurry image portion, other images may include pixels depicting blurry image portions at varying levels of blurriness.

To increase efficiency in generating training data from slide images (e.g., the image 104 of FIG. 1), some embodiments include accelerating labels collection for whole-slide image quality control. In some instances, the proposed framework is applicable to the labels collection for other types of digital pathology analyses.

There are two options for artifact identification: (1) pixel-wise classification using image segmentation approaches, in which a class label is assigned to each image pixel; and (2) tile-wise classification with image classification approaches, in which a class label is assigned to each image tile. As used herein, an image tile refers to a portion of an image (e.g., a rectangular portion, a triangle portion) including a set of pixels. The image tile may depict a corresponding point or region of a biological sample, such as cells and/or biomarkers. In some instances, a given slide image includes a plurality of image tiles, in which the number of image tiles may range from dozens or hundreds or thousands. The image tiles can be distributed such that the entire image or an area-of-interest within the image is covered by image tiles.

For generating the training data, pixel-wise classification is used to identify whether each image pixel passes or fails quality control (e.g., whether the pixel is blurry). This allows more flexibility for downstream analysis, compared to the tile-wise classification. The flexibility can be attributed to pixel-level accuracy the image segmentation algorithms provide. Additionally or alternatively, tile-wise classification can be used to generate the pixel-wise classification.

A. Framework for Generating Training Data

FIG. 2 shows a flowchart illustrating an example process 200 for generating training data, according to some embodiments. An image for generating training data can be accessed. In some instances, the image depicts at least part of a biological sample. The image can be a slide image depicting a tissue slice of a particular organ. In some instances, the biological sample has been stained using one or more types of assays (e.g., IHC, H&E).

At step 202, a specific quality control problem is determined. The specific quality control problem can include detecting artifact pixels. Additionally or alternatively, the quality control problem can include detecting other types of artifacts, such as foreign objects, tissue folds, or any other image objects or distortions that result in an inaccurate depiction of a part of a biological sample. As step 204, it is determined whether there are existing deep learning models or existing labeled datasets for a similar purpose with a same image modality. If such resources are available, the process 200 proceeds to step 206, in which initial labels are generated by (1) performing inference of target datasets with existing model designed for a similar purpose, (2) training a related model with existing labeled datasets and then applying such a model to the target datasets. If such resources (i.e. models or labeled datasets) are from a different image modality or image distribution, unsupervised domain adaption can be leveraged to adapt the existing model to unlabeled target datasets.

If none of the aforementioned resources are available or effective, the process 200 proceeds to step 208 to determine whether the quality control problem can be cast into an image processing problem. If so ("yes" path from the step 208), image pre-processing algorithms for predicting labels can be applied (step 210). As a result, a set of initial labels can be generated. Each label can predict whether a corresponding pixel of the image accurately depicts a corresponding point or region of the part of the biological sample. In some instances, the image pre-processing algorithms include image segmentation, morphological operation, image thresholding, image filtering, image contrast enhancement, blur detection, other image pre-processing algorithms, or combination thereof. Additionally or alternatively, the image pre-processing algorithms can include using one or more other machine-learning models to pre-process the image such that the set of initial labels can be generated.

For example, the image pre-processing algorithms can include blur detection to predict artifact pixels, in which the blur detection includes image filtering by image gradient calculation followed by thresholding to identify low gradient pixels. A set of pixels with low image gradients can be defined as a group of neighboring image pixels with relatively low intensity variations. In particular, pixels with low image gradients are considered to be more uniform in pixel intensity than pixels with relatively higher image gradients. In another example, the image pre-processing algorithms can include tissue-fold detection to predict tissue-folds (i.e. one piece of tissue folded onto another, creating darker tissue regions). The tissue-fold detection can include identifying a set of pixels with low image intensities, which are considerably darker than other tissue regions. The set of pixels can be identified by first applying an image filter (in this case, use smoothing kernels like Gaussian filters) followed by intensity thresholding.

If image pre-processing algorithms are unavailable or ineffective ("no" path from the step 208), one or more weakly-supervised image-processing models can be used to generate the initial labels (step 212). For example, a learning-based interactive segmentation models along with graphic user-interface can be used, which allow users to provide weak annotations like mouse-clicks for generating object segmentation maps.

Once initial labels are generated in the presence of existing resources, the initial labels can be modified to correct errors (step 214). Although not shown, the corrections of the initial labels can also be performed after step 212. In some instances, a machine-learning model is applied to the initial labels is applied to determine that a subset of the initial labels are erroneously labeled. For example, the initial label can indicate that the corresponding pixel accurately depicts the corresponding point or region of the biological sample, although the corresponding pixel includes one or more artifacts. By applying the machine-learning model, this error can be addressed by modifying the initial label.

Once the set of labels (including the modified labels) is obtained, a training image that includes the set of labels can be generated. At step 216, the training image with the set of labels can be used to iteratively generate additional labels to generate additional training data (step 216). The additional training data can include additional training images, in which each training image includes a corresponding set of labels. For example, if there are pre-trained models available, preferentially from a similar or same image domain, transfer-learning or few-shot learning can be applied to the training image to generate an initial model. The initial model can then be used to make predictions for other unlabeled images and generate labels for the other unlabeled images, thereby generating the additional training data. In another example, active-learning can be applied to the training image to select a set of images from a plurality of images, and the subset of images can be used for generating the corresponding sets of labels. In yet another example, semi-supervised or fully-supervised domain adaptation can be performed based on the training image to generate the additional training data. The process 2 terminates thereafter.

Using the above framework, various types of artifacts affecting accurate depiction of a biological sample can be considered as labels. In some instances, additional types of artifacts are added into existing label types associated with the training data. For example, a new type of artifacts can be merged with an existing label, such that all artifacts have the same class label as "artifact tissue." In some embodiments, a new type of artifact is associated with a new label that is separate from any of the existing labels, such that a number of label types can be increased. For example, a new class label for "tissue fold" can be generated.

In some instances, a plurality of labels are assigned to the same pixel to generate training data. In this instance, each label of the plurality of labels can predict whether the corresponding pixel depicts at least part of an artifact associated with a particular artifact type (e.g., blur, foreign object, tissue fold). For example, tissue folds can interweave or otherwise correlate with blurry artifacts. A pixel being labeled as "tissue fold" can also depict a blurry portion of the image. The above pixel can thus be associated with two labels: (i) "tissue fold"; and (ii) "blurry artifact". Machine-learning techniques such as multi-label classification techniques can be used to predict each image pixel as being associated with one or more types of artifacts.

B. Process for Generating Labels of Training Images

FIG. 3 shows a flowchart illustrating an example process 300 for using machine-learning models for generating training data, according to some embodiments. The example process 3 for generating training data can include generating labels that predict whether a corresponding pixel accurately depicts a point or region of a part of the biological sample. The example process can be incorporated into the example process presented in FIG. 2.

At step 302, an image depicting at least part of a biological sample can be accessed. The image can be a slide image depicting a tissue slice of a particular organ. In some instances, the biological sample has been stained using a staining protocol corresponding to a particular type of assay (e.g., IHC, H&E). For example, the image can depict the biological sample stained using a staining protocol corresponding to a Ki67 IHC assay.

At step 304, image pre-processing can be applied to the image to generate a pre-processed image. The pre-processed image can include a plurality of labeled pixels. Each labeled pixel of the plurality of labeled pixels can be associated with a label predicting whether the pixel accurately depicts a corresponding point or region of the at least part of the biological sample. The label can thus indicate whether the corresponding pixel is from an artifact, non-artifact tissue or other type of regions.

In some instances, the image pre-processing algorithms include image segmentation, morphological operation, image thresholding, image filtering, image contrast enhancement, blur detection, other image pre-processing algorithms, or combination thereof. The image pre-processing can include analyzing image gradient of pixels across the image. For example, image pre-processing can be used to identify a set of pixels that are smooth (i.e. with no or very small changes in local image intensities). The smooth pixels can be identified by calculating image gradients and applying a segmentation threshold. The segmentation threshold can represent a value that predicts whether a given pixel depicts at least part of an edge shown in an image. The segmentation threshold can be a predefined value. In some instances, the segmentation threshold is determined by executing Otsu's Method or balanced histogram thresholding method. Any smooth pixels with image gradients lower than the segmentation threshold can be identified as being either blurry tissue or non-tissue regions that are uniform in image intensities. Additionally or alternatively, the image pre-processing algorithms can include using one or more other machine-learning models to pre-process the image such that the plurality of labeled labels can be generated.

At step 306, a machine-learning model can be applied to the pre-processed image to identify one or more labeled pixels from the plurality of labeled pixels. Each label of the one or more labeled pixels can be predicted to have been erroneously labeled by the image pre-processing algorithm. The error can be due to the image pre-processing algorithms not being effective enough to identify the correct labels for all pixels. For example, a segmentation threshold applied as part of the image pre-processing algorithms can correctly identify artifacts in some images, but the same segmentation threshold can be too low for rest of the images. In another example, a segmentation threshold that can correctly identify artifacts in some portions of an image may be too low for remaining portions of the same image. In both examples, some of the artifact pixels can be improperly labeled as tissue regions.

At step 308, a label of each of the one or more labeled pixels can be modified. In some instances, the modification is performed by a user via a graphical user interface. Additionally or alternatively, the labels can be automatically modified using one or more executable instructions (e.g., if-else conditional statements).

At step 310, a training image can be generated. The training image can include the labeled pixels, including the labeled pixels with the modified labels. In some instances, additional image features (e.g., image-gradient value) is associated with each labeled pixel to further facilitate training of a machine-learning model for identifying artifact pixels.

At step 312, the training image is outputted. The training image can be used for generating additional training data. The additional training data can include additional training images, in which each training image includes a corresponding set of labels. Various types of machine-learning techniques can be used to generate the additional training data. For example, the machine-learning techniques can include, but are not limited to using machine-learning models trained via active-learning, transfer-learning, few-shot learning, or domain adaptation. Process 300 terminates thereafter.

C. Example Training Image with Labels

Figure 4:
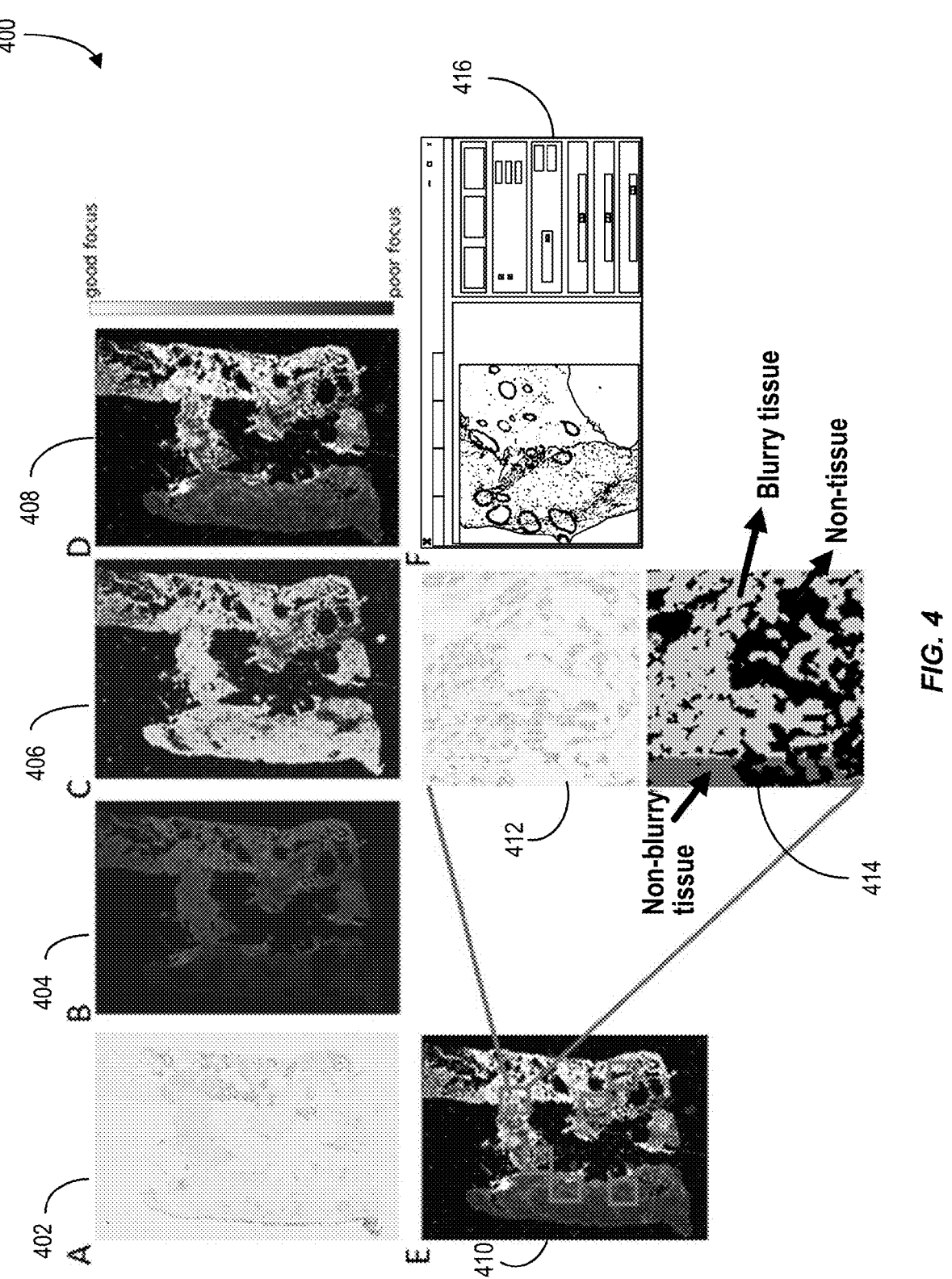
FIG. 4 shows an example set of images in which labels have been generated, according to some embodiments.

FIG. 4 shows an example set of images 400 in which labels have been generated, according to some embodiments. Each of the labels indicate whether a corresponding pixel accurately depicts at least part of a biological sample. An image 402 shows a thumbnail image corresponding to a whole-slide image depicting a tissue section. An image 404 shows a gradient-based map of the image generated by applying Laplacian filtering and then Gaussian smoothing to the thumbnail image or an image corresponding to the whole-slide image at another resolution. As shown in the image 404, pixels with image gradients lower than a segmentation threshold can be identified to be either blurry tissue or non-tissue regions that are uniform in image intensities.

An image 406 shows a tissue mask generated by applying a uniform filter and then thresholding the thumbnail image (or the corresponding image at another resolution). For example, a tissue detector can be applied to the image by smoothing the image by a uniform filter and applying a segmentation threshold for the intensity of R, G, and B channels. As previously noted, the segmentation threshold can represent a value that predicts whether a given pixel depicts at least part of an edge shown in a given image. The segmentation threshold can be a predefined value. In some instances, the segmentation threshold is determined by executing Otsu's Method or balanced histogram thresholding method. A pixel with intensity values higher than the edge-detection threshold across of all three channels can be identified as tissue pixels. The tissue mask can be used to generate whole-slide blur masks (e.g., an image 408) with three classes, including non-tissue, blurry tissue, and non-blurry tissue.

The image 408 shows a pre-processed image (e.g., a blur map) generated by merging the images 406 and 404. For example, the pre-processed image shown in the image 408 depicts predicted artifact pixels in the thumbnail image, in which darker red colors identify the predicted artifact pixels.

An image 410 shows the pre-processed image from which a set of image tiles can be identified. In some instances, image tiles with a number of artifact pixels are selected automatically. The pre-processed image 410 can correspond to the image 408 and may include labels with various amounts of blur. Image tiles 412 and 414 represent an image tile selected from the pre-processed image 410. In particular, the image tile 412 depicts a region of the biological sample stained using an ER-Dabsyl IHC assay (ER: estrogen receptor). The image tile 414 identifies initial labels in the region. The initial labels can include a plurality of classes, such as blurry tissue, non-tissue, and non-blurry tissue.

An image 416 shows a screenshot of an interactive graphical user interface showing an image tile, with which a user can interact (e.g., mouse clicks) to modify initial labels. In some instances, the modification of the initial labels is performed by applying a machine-learning model to the pre-processed image 410 or image tiles selected from 410. The machine-learning model can use a limited number of annotations to modify entire blur masks with high accuracy. The machine-learning model can be a separate process (not shown) or can be integrated into the graphical user interface. The application of the machine-learning model can be performed either with CPUs or by leveraging highly-paralleled computation with GPUs, thus ensuring efficient labels correction.

D. Determining Blurriness Levels for Accurate Determination of Labels

Figure 5:
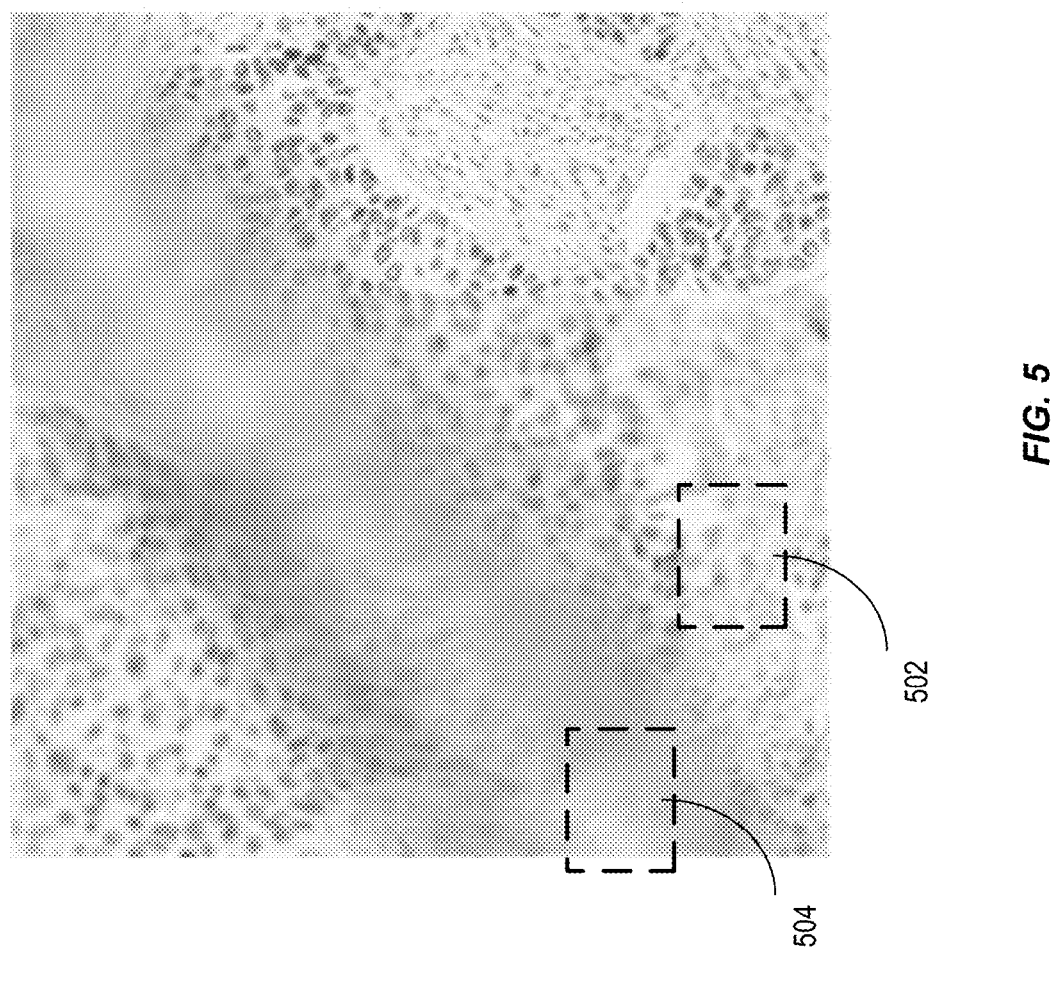
FIG. 5 shows an example image that include image portions that respective show varying levels of blurriness.

Subjectively determining a particular threshold for detecting artifact pixels may inevitably lead to a mismatch between experts' perception of blurriness and the blur level. Such mismatch can result in considerable degradation of digital pathology algorithm performance. FIG. 5 shows an example image that include image portions that respective show varying levels of blurriness. In particular, pathologists have flagged the image 500 as analyzable for >70% of the image. However, it can actually be shown that most of the image 500 is blurry and can be problematic for a classification model. For example, an image tile 502 can be considered as non-blurry by a particular expert, but would not be sufficiently in-focus for the classification model to accurately detect biomarkers.

To improve consistency of identifying artifact pixels in an image, performance changes of a classification model (e.g., a cell-classification) can be quantitatively assessed at different blur levels. A blur threshold can be selected, in which the blur threshold corresponds to a blurriness level that is predicted to result in performance degradation of the classification model beyond a tolerance threshold. The blur threshold can be used to flag any tiles in the image (e.g., an image tile 504) that are considered to be more blurry. In some instances, any pixels in an image tile are labeled as blurry tissue, if these pixels are localized in image portions that correspond to tissue regions (e.g., within the tissue regions in a tissue mask 406) and if their respective image gradients are lower than the blur threshold.

In some instances, the blur threshold can be determined by generating a set of sample images. Each sample image of the set of sample images can be generated by applying Gaussian filtering with a particular sigma value to depict one or more regions of the sample at varying blurriness levels.

Additionally or alternatively, volume-scan feature of digital pathology scanners can be used to set the blur threshold. For example, a digital pathology scanner and/or z-stack of microscopes can be used to scan a z-axis of a slide to obtain a set of scans with increasing distances away from the nominal focal plane. The set of scans can correspond to increasing levels of blurriness. An example process for using volume-scan feature of determining the blur threshold can be as follows. First, given a fixed assay and a fixed downstream digital pathology analysis (e.g., a cell classification model), a training image with labels can be rescanned in "volume scan" mode of a scanning device, thereby generating a volume-scanned image. In some instances, scanning configurations of the volume scan include scanning the training image using non-nominal-focus scan planes with a fixed intervals (e.g., 1-micron apart). Based on the volume-scanned image, a set of pixels can be detected, where accuracy of the digital pathology analysis becomes inadequate. In some instances, a range of image gradients in the set of identified pixels can be calculated. A maximum image gradient in the range of image gradients can be set as the blur threshold. A pixel having an image gradient exceeding the blur threshold can be predicted as a pixel that contributes to accuracy degradation of a subsequent digital pathology analysis beyond tolerance levels.

E. Identifying Tissue-Fold Artifacts for Generating Training Data

Figure 6:
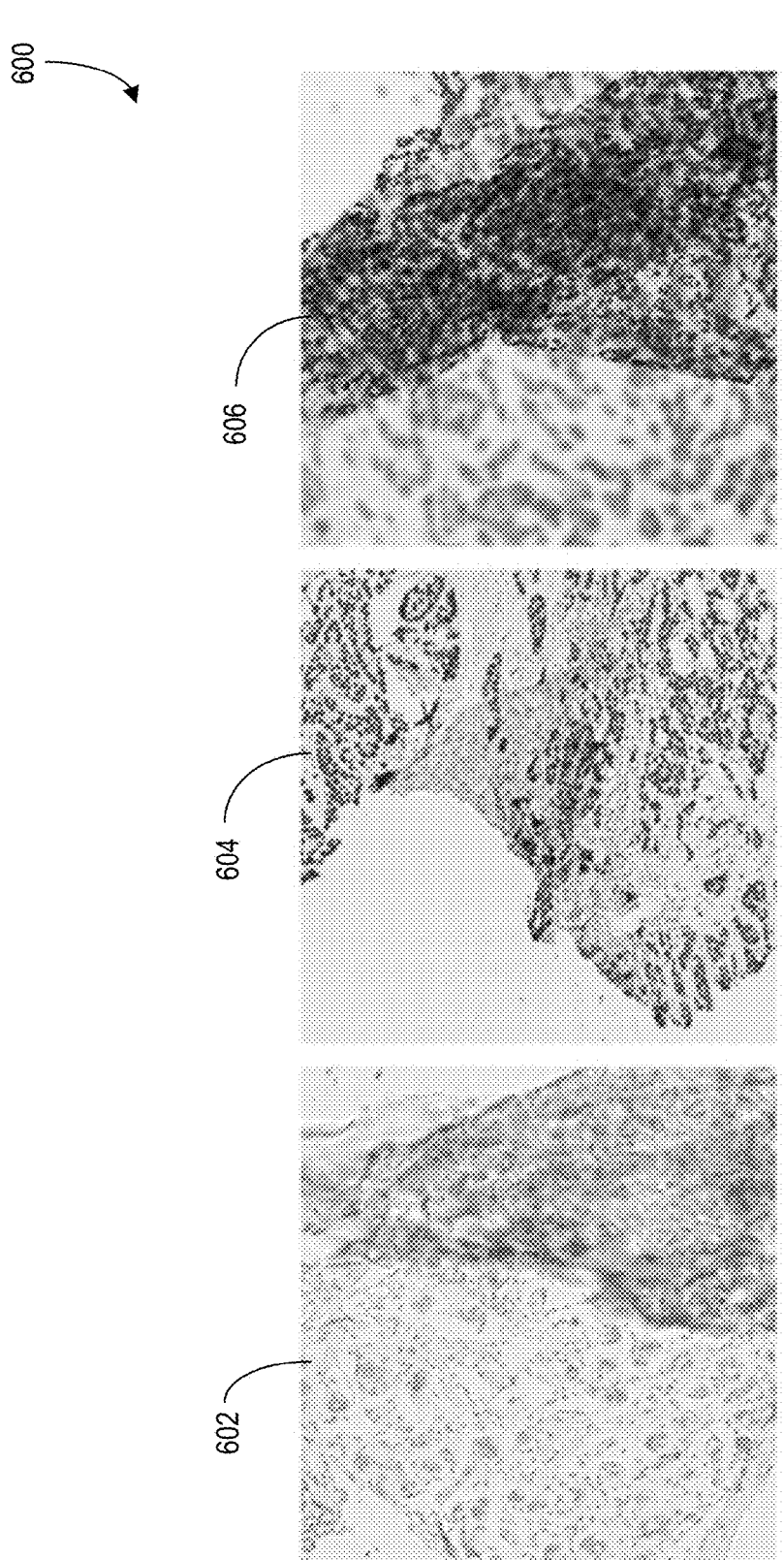
FIG. 6 shows an example set of images that include one or more tissue folds in corresponding biological samples.

Tissue folds typically occur during tissue processing (e.g., preparation of tissue slides), in which one or more parts of a tissue section do not attach firmly on a glass slide and flip onto another part of a tissue section. FIG. 6 shows an example set of images 600 that include one or more tissue folds in corresponding biological samples. As shown in FIG. 6, tissue folds can have diverse appearances. For example, a first image 602 depicts tissue folds that are much darker in intensity than that of the surrounding non-tissue-fold regions. A second image 604 depicts tissue folds that are lighter in intensity, while cells in the underlying tissue layer are still quite visible. A third image 606 depicts tissue fold regions being accompanied by blurry regions. The blurry regions can be caused by the thickness of tissue folds exceeding the depth of field of scanners.

Figure 7:
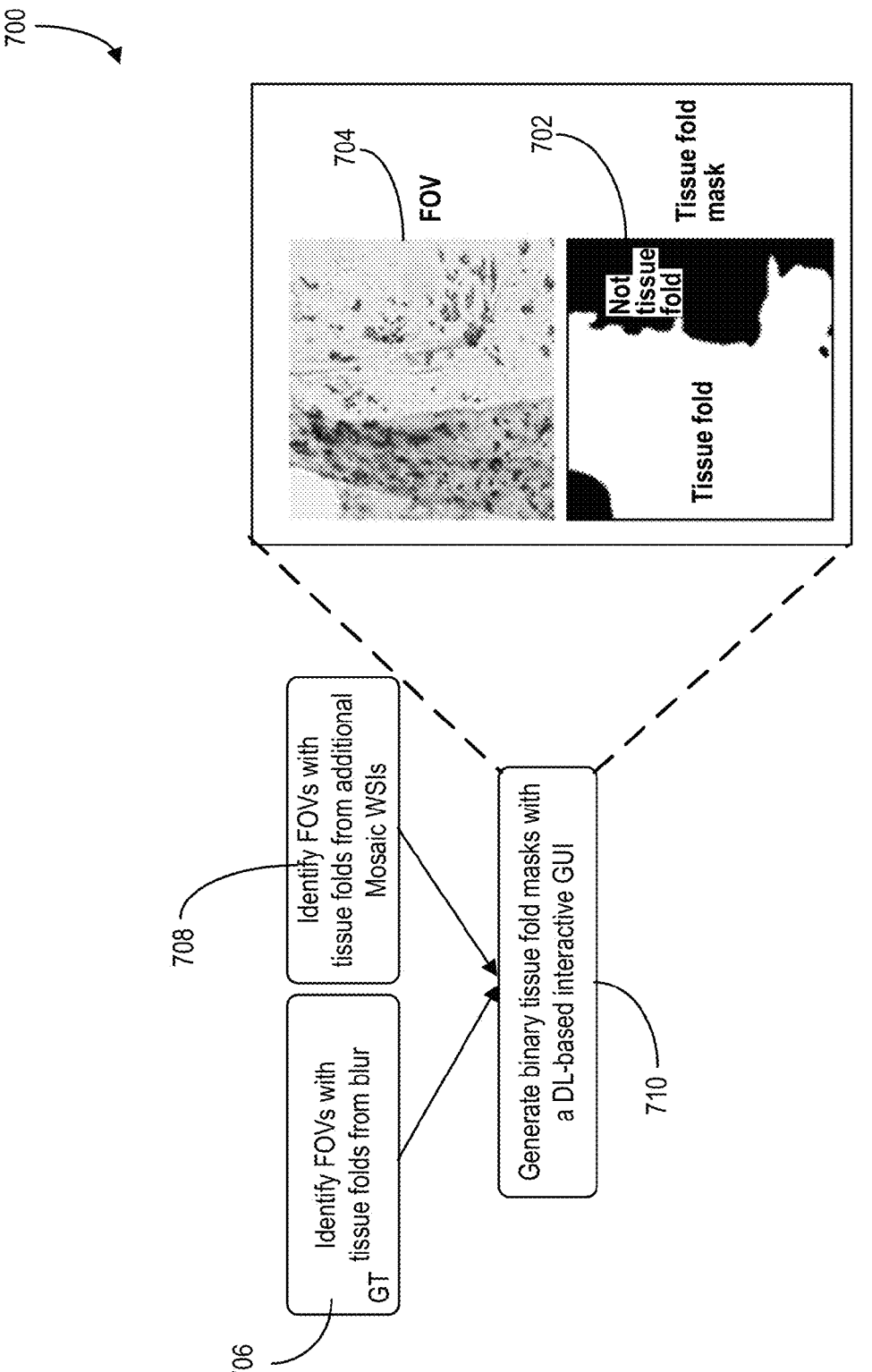
FIG. 7 shows an example schematic diagram for generating training data for tissue fold regions, according to some embodiments.

To generate the ground-truth images that include tissue fold regions, a different process may b used. FIG. 7 shows an example schematic diagram 700 for generating training data for tissue fold regions, according to some embodiments. The training data can then be used to generate binary tissue fold masks. In FIG. 7, there were no existing machine-learning models, no existing ground truth, and no effective image-processing approach for generating initial ground truth. Thus, referring back to FIG. 2, the answers for step 204 and step 208 were both identified as "no". As a result, step 212 was performed to generate the training data for tissue fold regions, in which an interactive GUI was utilized to generate ground-truth images. Generating the training data for tissue fold regions can include using the interactive segmentation GUI for generating binary tissue-fold masks, where the two classes are tissue fold and non-tissue-fold.

In some instances, the tissue-fold mask 702 is generated based on one of the following three approaches: (1) the blur ground truth (for FOVs 704 selected from the blur ground truth) (block 706), (2) regions identified by image-processing algorithms (e.g., identifying FOVs with tissue folds from additional Mosaic WSIs (block 708)), (3) regions selected by the interactive GUI (block 710). In some instances, each of the three approaches is performed in sequence to generate the tissue-fold masks. For example, it can be determined whether the tissue-fold mask generated based on the blur ground truth is accurate (e.g., based on visual inspection). If not, the regions generated by the image-processing algorithms can be used. If the regions generated by the image-processing algorithms do not result in an accurate tissue-fold masks, then the regions manually selected by the interactive GUI can be used for generating the tissue-fold masks. (block 710).

In some instances, the interactive GUI includes one or more machine-learning models to facilitate selection of the tissue-fold regions. For example, the interactive GUI can include: (i) a first GUI component that enables manual delineation to select image regions and visualizes the selected regions for iterative manual corrections; and (ii) a second GUI component that enables user input, such as scribbles and mouse clicks, to guide automated identification of targeting regions. For the interactive GUI, an imaging processing method and be designed or a machine learning model can be trained to respond to user input and generate a segmented mask. For example, the machine-learning model can be trained with simulated user clicks inside the target image region as well as the original image as model input and output a segmentation mask. In effect, the deep-learning interactive GUI can learn how to identify targeting regions with user input, which is usually only a few pixels or a part of the targeting image regions. In addition, a user can iteratively modify existing input or add new input to modify the segmented masks until the mask is of high accuracy and can be used as ground-truth for training a machine learning model.

Figure 8:
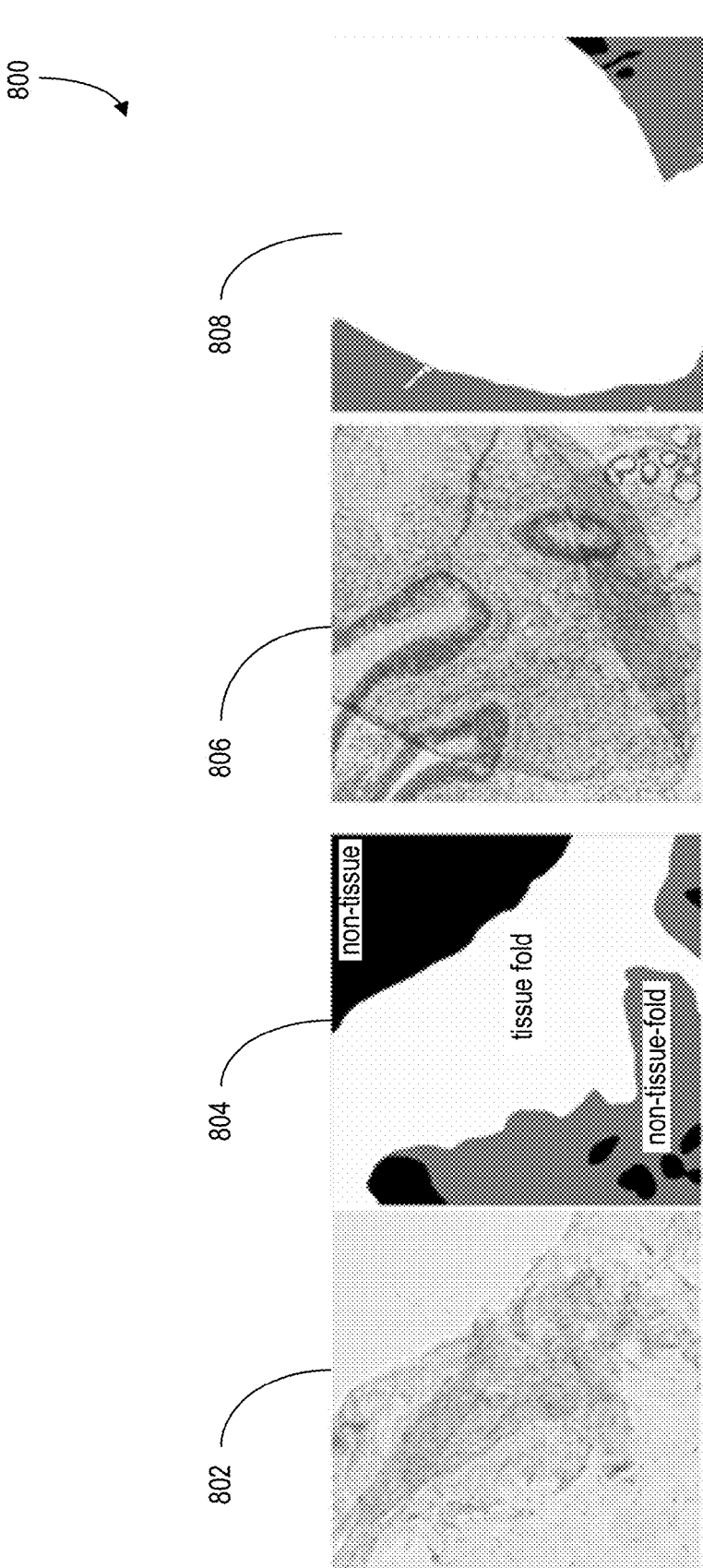
FIG. 8 includes a set of example three-class tissue-fold masks, according to some embodiments.

The binary tissue-fold mask can be combined with a corresponding tissue mask, thereby generating a three-class tissue-fold mask. FIG. 8 includes a set of example three-class tissue-fold masks 800, according to some embodiments. A first three-class tissue-fold mask 804 corresponds to a first slide image 802, and a second three-class tissue-fold mask 808 corresponds to a second slide image 806. Each of the three-class tissue-fold masks 804 and 808 can include, for each pixel, a first classification for a non-tissue region, a second classification for a non-tissue-fold tissue region, and a third classification for a tissue fold region.

F. Integrating Various Types of Artifacts into Classification Labels

To train the machine-learning model to detect two or more types of artifacts, the artifact regions detected in the training images can be distinguished between blur ground training labels and tissue-fold ground labels. For example, four types of classifications can be integrated into the segmentation mask, in which the four types of classifications can include:

(1) a non-tissue region, (2) a blurry but non-tissue-fold region, (3) a tissue-fold but non-blurry region, and (4) an analyzable tissue region.

Figure 9:
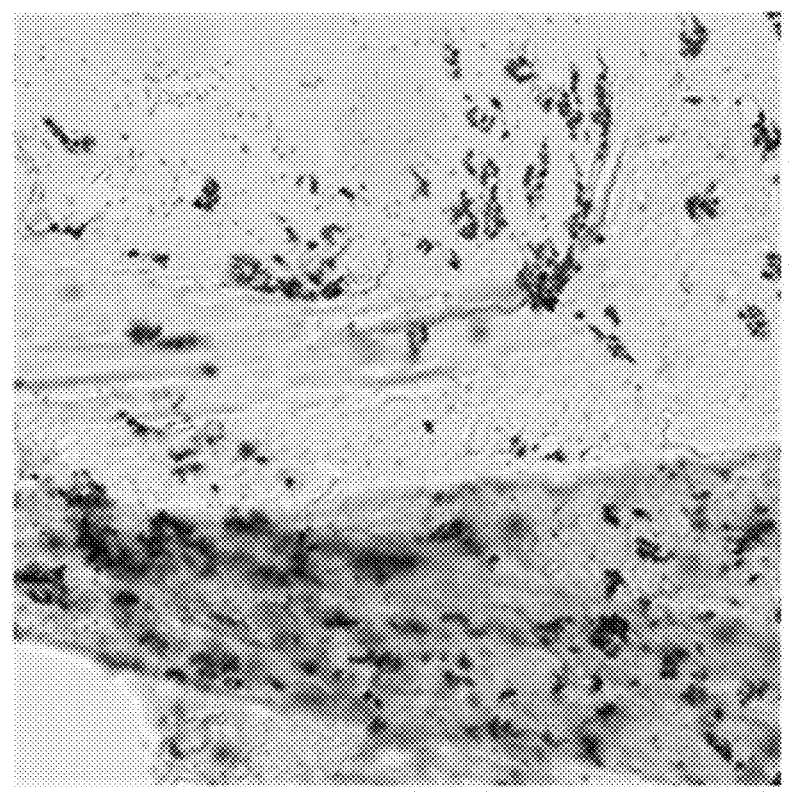
FIG. 9 shows an example image (e.g., FOV) that includes tissue fold regions, in which the tissue fold regions depict both non-blurry and blurry regions.

However, the four-classification label configuration assumes that blurry tissue regions and tissue folds regions are mutually exclusive, which is not always the case. For example, tissue fold regions can often be accompanied by blurry regions, as shown in images 602 and 606 of FIG. 6. For example, FIG. 9 shows an example image 900 (e.g., FOV) that includes tissue fold regions, in which the tissue fold regions depict both non-blurry and blurry regions. Thus, in FIG. 9, assigning blurry pixels in tissue fold regions either as "blur" class or "tissue fold" class creates confusion during training of a corresponding machine-learning model.

Figure 10:
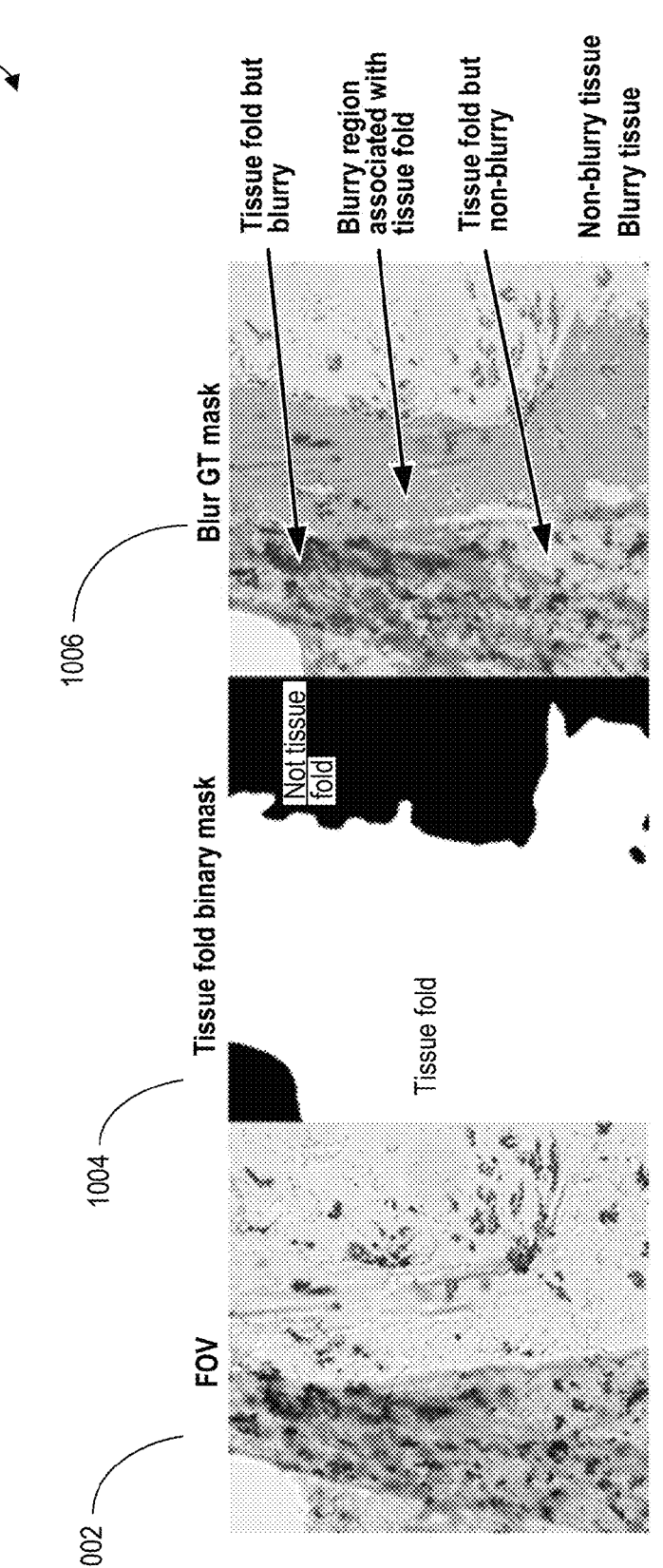
FIG. 10 shows an example set of images that depict various artifact regions.

In another example, FIG. 10 shows an example set of images 1000 that depict various artifact regions. For example, an FOV 1002 depicts blurry regions that are interlaced with tissue fold regions. A tissue-fold binary mask 1004 can differentiate the tissue fold from the non-tissue fold regions. In contrast to the tissue-fold binary mask 1004, a blur ground-truth mask 1006 that segments an image into four classifications depicts a confusing pattern of classified regions. For example, the presence of the interlaced blurry regions can split the tissue fold regions into a plurality of small tissue-fold subregions, which can lead to unclear semantics, and considerably increases the difficulty for machine-learning models to learn meaningful features for the tissue-fold class.

Figure 12:
FIG. 12 shows additional artifact masks using a combined artifact classification technique, according to some embodiments.

To address the inaccurate classification of tissue fold regions, two types of classification strategies can be implemented. A first strategy can include combining the tissue-fold region and blurry tissue regions into a single class (e.g., the non-analysis region class). Blurry tissue regions and tissue fold regions are classified as the "non-analysis tissue" class. In effect, a three-class segmentation can be outputted, which classifies each pixel into one of the following three classes: non-tissue, analyzable tissue; and non-analysis tissue. For example, FIG. 11 shows an example artifact mask 1100 generated using a combined artifact classification technique, according to some embodiments. FIG. 12 shows additional artifact masks 1200 using a combined artifact classification technique, according to some embodiments. In FIG. 12, three-class ground truth masks 1204 and 1208 segment regions of a biological sample depicted in an FOV (raw RGB) stained with TAMRA-ER 1202 and QM-Dabsyl-ER/TAMRA-PR 1206. For the FOV 1202, the non-analysis regions were mostly non-blurry. For the FOV 1206, the non-analysis region includes non-blurry tissue fold regions and blurry regions. FIGS. 11 and 12 thus classify an image region into one of three classes: (i) non-tissue; (ii) analyzable tissue; and (iii) non-analysis tissue.

Figure 13:
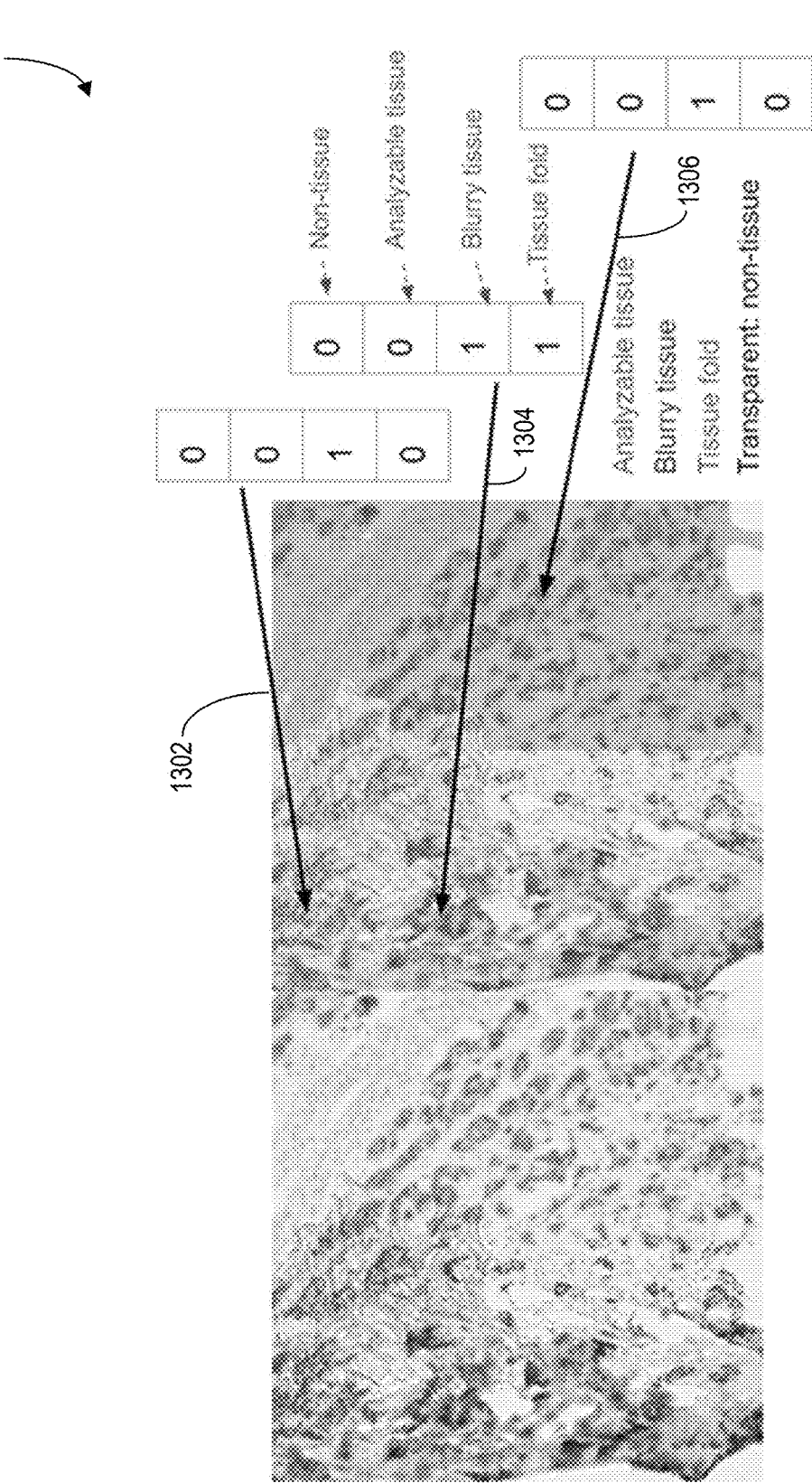
FIG. 13 shows a slide image in which a pixel is associated with two or more classification labels, according to some embodiments.

A second classification strategy can include associating a pixel with two or more classification labels. The multi-label segmentation can facilitate classification of each pixel as one or more of the following four classes: non-tissue; analyzable tissue; non-analysis tissue; and tissue fold. To generate the multiple classifications, a binary value can be assigned for each classification (e.g., either positive negative for that class) at each pixel location. For example, FIG. 13 shows a slide image 1300 in which a pixel is associated with two or more classification labels, according to some embodiments. In FIG. 13, the slide image 1300 depicts pixels 1302 and 1306 that are associated with a single label. The slide image 1300 also depicts a pixel 1304 that is associated with two labels (e.g., a blurry tissue label, a tissue-fold label). As shown in FIG. 13, regions of the biological sample being depicted in the slide image 1300 can be associated multiple different labels. The 4×1 arrays shown in FIG. 13 thus identifies labels for each pixel, in which 0 denotes negative presence of a corresponding region (e.g., this pixel does not belong to this class) and 1 denotes positive presence of the corresponding region (e.g., this pixel belongs to this class).

FIG. 14 shows a process 1400 for identifying a classification label for a pixel associated with both blurred and tissue fold regions, according to some embodiments. At step 1402, a pixel associated with multiple classifications (e.g., non-analysis and tissue folds) can be identified. At step 1404, the pixel can be associated with a binary value for each classification of a set of classifications. The set of classifications can include: (a) non-tissue; (b) analyzable tissue; (c) blurry tissue; and (d) tissue folds. The binary value can indicate a presence of an object associated with the corresponding classification (e.g., tissue fold). For example, the pixel 1304 includes a "1" binary value for both blurry tissue and tissue folds and includes a "0" binary value for non-tissue and analyzable tissue. The "1" binary values can indicate that the pixel 1304 depicts both blurry tissue and tissue folds. In some instances, the "blurry tissue" class can be replaced by non-analysis class (either blurry or tissue folds). In some instances, one of the multiple classifications is selected to represent the pixel. At optional step 1406, the set of classifications can be ranked based on their respective predicted probability values at the pixel location. In particular, a probability of how likely a pixel belongs to each classification of the set of classifications can be generated (e.g., using a machine-learning model). For example, a three class segmentation model generates three numbers for each pixel, which are the probabilities of this pixel belong to each class, such as [0.1,0.2,0.7]. In this example, the set of classifications can be ranked according to the probabilities, in which class 3 would be ranked with the highest value. In effect, the highest probability corresponds to the most likely class to which the pixel may belong. At optional step 1408, the classification with highest probability value can be selected as a final prediction label for the pixel.

To generate the labeled images for training the machine-learning model, additional processing for ground truth masks need not be implemented. Rather, the two sets of ground truth masks can be used, including a first set corresponding to three-classification blur masks (e.g., non-tissue, analyzable tissue, blurry tissue), and a second set corresponding to tissue-fold regions inside tissue regions (e.g., binary tissue fold masks). In some instances, the labeling of each pixel can be implemented using a 4×1 array during model training.

Figure 15:
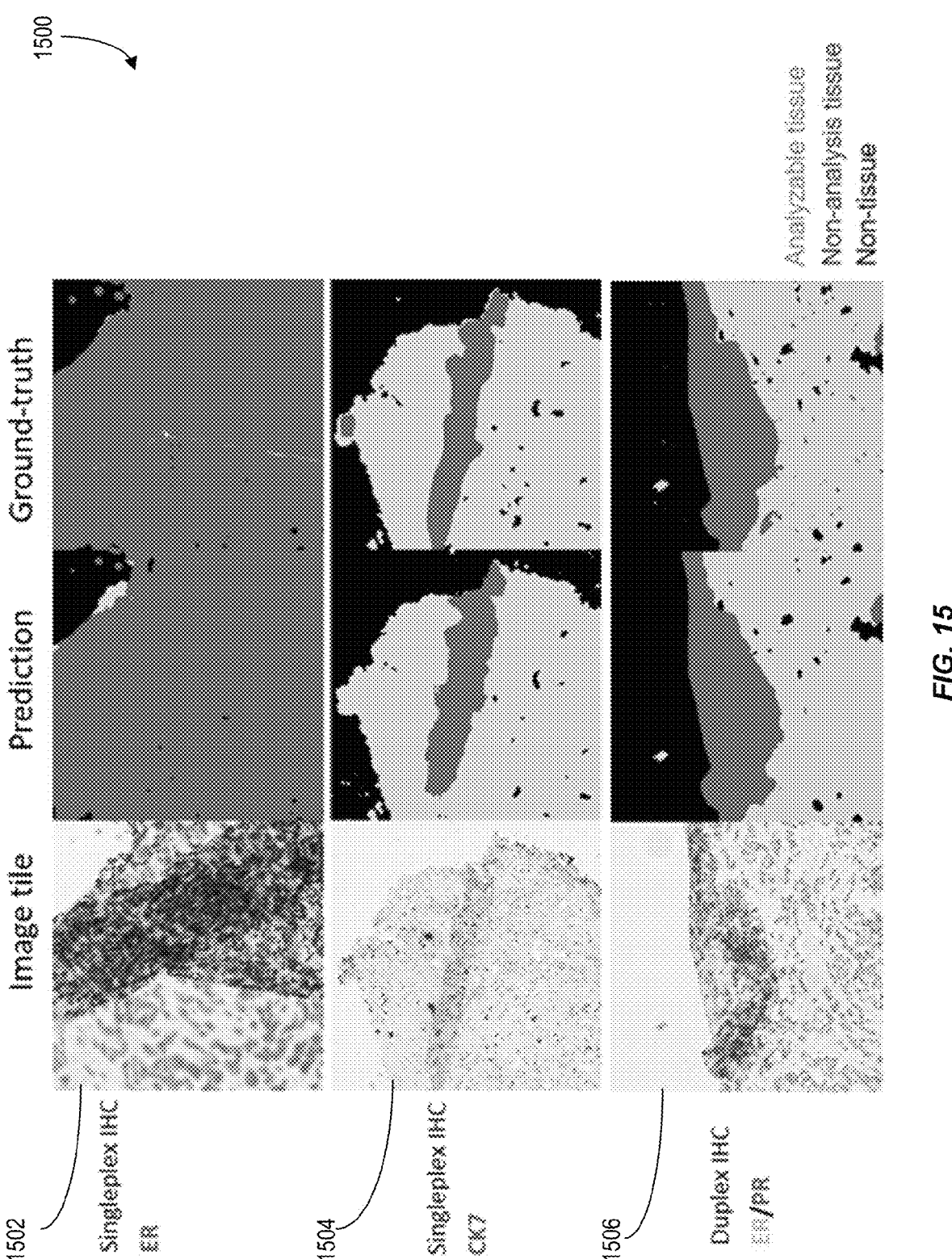
FIG. 15 shows a comparison between the predicted classification with ground truth masks, according to some embodiments.

The machine-learning techniques described above can facilitate accurate classification of regions in the slide image. For example, FIG. 15 shows a comparison 1500 between the predicted classification with ground truth masks, according to some embodiments. For example, a first set of images 1502 show a comparison between a predicted mask and a corresponding ground truth mask for an image stained using singleplex IHC that includes estrogen receptor (ER). A second set of images 1504 show a comparison between a predicted mask and a corresponding ground truth mask for an image stained using singleplex IHC that includes cytokeratin 7 (CK7). A third set of images 1506 show a comparison between a predicted mask and a corresponding ground truth mask for an image stained using duplex IHC that includes estrogen receptor and progesterone receptor (ER/PR). Based on the comparison, it can be found that the predicted segmented masks are qualitatively similar to the corresponding ground truth masks.

Figure 16:
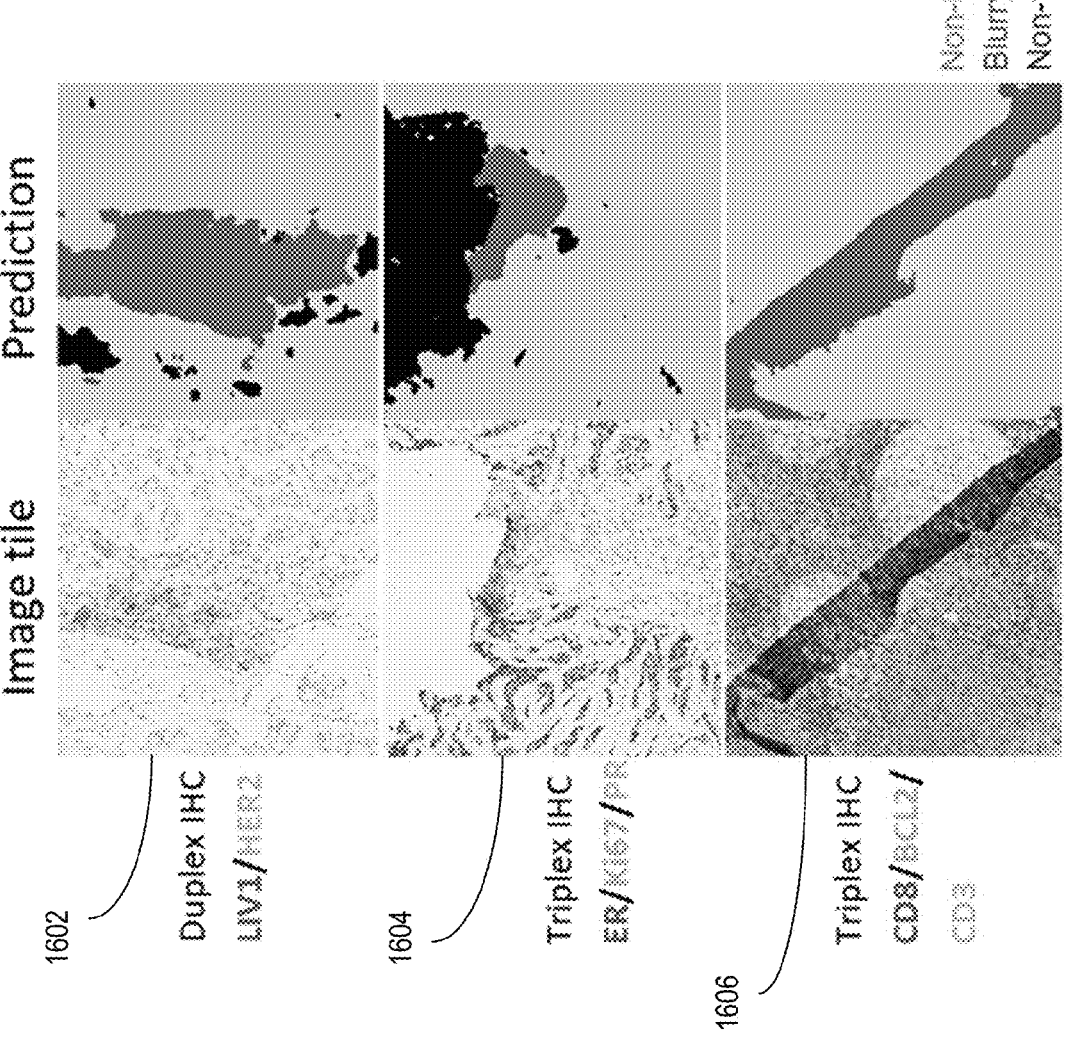
FIG. 16 shows the predicted regions in slide images with different types of IHC assays, according to some embodiments.

In addition, FIG. 16 shows the predicted regions in slide images 1600 with different types of IHC assays, according to some embodiments. For example, a first image 1602 shows an image tile stained using a duplex IHC assay that includes LIV/HER2 and a corresponding predicted segmentation mask that includes three classifications (e.g., non-blurry tissue, blurry tissue, non tissue). A second image 1604 shows a second image tile using a triplex IHC assay that includes ER/Ki67/PR and a corresponding predicted segmentation mask that includes the three classifications. A third image 1606 shows a third image tile using a triplex IHC assay that includes CD8/BCL2/CD3 and a corresponding predicted segmentation mask that includes the three classifications. A qualitative assessment of the predicted segmentation masks show accurate classifications of non-blurry tissue, blurry tissue, and non-tissue.

III. Training a Machine-Learning Model to Accurately Detect Artifact Pixels

As explained above, training a machine-learning model to accurately detect artifact pixels can be complicated since images can be stained using various types of IHC assays. For example, fluorescent-based IHC assays can use multispectral imaging to unmix several different fluorescent spectra, which may enable accurate identification of multiple antigens on the same tissue section. These multiplex IHC assays, however, can result in more complex staining patterns relative to singleplex IHC assays (e.g. IHC assays targeting a single type of antigen). FIG. 17 shows an example set of images 1700, in which each image has been stained using a staining protocol corresponding to a particular type of IHC assay. An image 1702 shows a biological sample stained with Hematoxylin only. An image 1704 shows a biological sample stained using a singleplex IHC assay. In particular, the image 1704 shows nucleus staining pattern of the biological sample with Dabsyl-stained estrogen receptor, in which Dabsyl was used as a chromogen and generated the yellow stain. Identifying artifacts (e.g., artifact pixels) in the images 1702 and 1704 can be relatively straightforward.

The artifact-detection process becomes considerably more difficult in images stained using staining protocols corresponding to multiplex IHC assays. For example, an image 1706 shows a biological sample stained using a duplex IHC assay. In particular, the image 1706 shows nucleus staining patterns of the biological sample stained with Tamra for identifying estrogen receptors (i.e. ER) and Dabsyl for identifying progesterone receptors (i.e. PR). In the image 1706, Tamra can represent a purple stain and Dabsyl can represent a yellow stain. However, the image 1706 further shows a blend of both stain to show a range of color hues, which can be caused by various factors including staining protocols, interference of chromogens, and relative expression levels of the biomarkers. In another example, an image 1708 shows a biological sample stained using another type of duplex IHC assay. In particular, the image 1708 shows the biological sample stained using Tamra-PDL1 (programmed death-ligand 1) and Daybsyl-CK7 (cytokeratin 7), in which tissue regions stained with PDL1 mostly show staining in the membrane and tissue regions stained with CK7 mostly show staining in the cytoplasm. However, the image 1708 also shows tissue regions in which both stains overlap. Detecting artifacts from these types of images can thus be challenging.

Accordingly, a machine-learning model can be trained to detect artifact pixels in images with various staining patterns. The technique can include accessing a training image depicting at least part of a biological sample. The training image can include a plurality of labeled pixels, in which each pixel is associated with a label. The label predicts whether the pixel is an artifact pixel. The training image can be used to train the machine-learning model. The machine-learning model can include a set of convolutional layers, in which a first loss calculated for a first convolutional layer and a second loss calculated for a second convolution layer can be used to train the machine-learning model to detect artifact pixels at a target image resolution.

A. Architecture for Training a Machine-Learning Model to Detect Artifact Pixels

Figure 18:
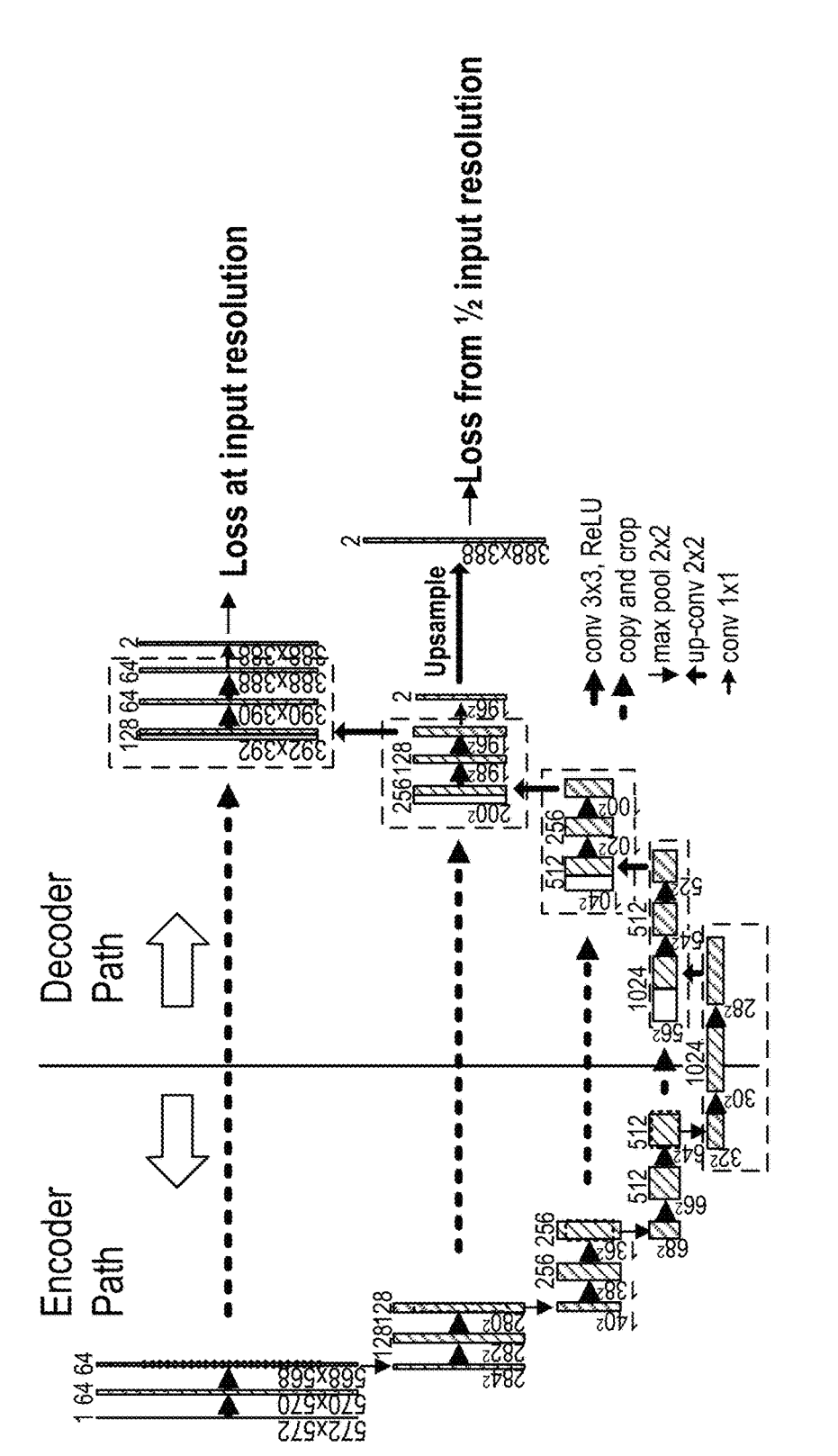
FIG. 18 shows a schematic diagram illustrating an example architecture used for training the machine-learning model to detect artifacts in images, according to some embodiments.

To enhance the capability of the machine-learning models to effectively detect artifact pixels across various image resolutions, supervision can be added during the training phase of the machine-learning model training at each of a set of image resolutions. FIG. 18 shows a schematic diagram illustrating an example architecture 1800 used for training the machine-learning model to detect artifacts in images, according to some embodiments. In FIG. 18, a encode-decoder model architecture for image segmentation is shown, at which features from each of multiple image resolutions in the decoder path can be utilized for pixel-wise classification.

In some instances, the encoder-decoder model architecture includes a U-Net. the machine-learning model includes a U-Net machine-learning model trained to detect artifact pixels in images. The U-Net machine-learning model can include a contracting path and an expansive path. The contracting path can include a first set of processing blocks, in which each processing block corresponds to processing the training image at a corresponding image resolution. For example, a processing block can include applying two 3×3 convolutions (unpadded convolutions) to an input (e.g., the training image), in which each convolution is followed by a rectified linear unit (ReLU). The output of the processing block can thus include a feature map of the training image at a corresponding image resolution. The processing block also includes a 2×2 max pooling operation with stride 2 for downsampling the feature map of the processing block to a subsequent processing block which can repeat the above steps at a lower image resolution. At each downsampling step, the number of feature channels can be doubled.

Following the contracting path, the expansive path includes a second set of processing blocks, in which each processing block corresponds to processing the feature map outputted from the contracting path at a corresponding image resolution. For example, a processing block of the second set of processing blocks receives a feature map from the previous processing block, applies a 2×2 convolution ("up-convolution") that halves the number of feature channels, and concatenates the feature map with a cropped feature map from a corresponding processing block of the contracting path. The processing block can then apply two 3×3 convolutions to the concatenated feature map, each convolution followed by a Batch Normalization layer (optional) and a ReLU. The output of the processing block includes a feature map at a corresponding image resolution, which can then be used as input for a subsequent processing block at a higher image resolution. The processing blocks can be applied until a final output is generated. The final output can include an image mask. The image mask can identify a set of artifact pixels, in which each artifact pixel predicts is predicted to not accurately depict a point or region of the at least part of the biological sample.

In some instances, a loss at each processing block or some of the processing blocks of the second set of processing blocks is calculated, which can be used to determine a total loss for the U-Net machine-learning model. The total loss can be a computation based on the losses calculated from the chosen processing blocks. For example, the total loss can be determined based on a sum or a weighted sum of the losses generated from each of the second set of processing blocks. In a second example, the total loss can be determined based on an average or a weighted average between the losses calculated for each processing block. The total loss for the U-Net machine-learning model can then be used to learn parameters of the U-Net machine-learning model (e.g., parameters of one or more filters of a convolutional layer). Using the total loss for the U-Net machine-learning model allows detection of artifact pixels across various image resolutions.

In some instances, a loss for each processing block of the second set of processing blocks can be determined by applying a 1×1 convolution layer to the feature maps outputted by the processing block to generate one or more modified feature maps and determine the loss from the one or more modified feature maps. In particular, the 1×1 convolution can be applied such that the number of modified feature maps corresponds to the number of class labels (e.g. three modified feature maps for three label types). In some instances, the modified feature maps are up-sampled to the same resolution as the output of the machine-learning model (e.g., an image mask). Additionally or alternatively, the image mask (with the same size as the training image) can be down-sampled to the same resolution as the modified feature maps.

B. Integrating Global Information for Detecting Large-scale Artifacts in Images

In some instances, a second machine-learning model is trained to detect artifact pixels in an image, in which the artifact pixels are predicted to correspond to larger artifacts in the image. The use of additional machine-learning models can avoid limiting the input tile sizes in accordance with limits of computing resources (e.g., hardware memories). To this end, to incorporate the information from neighboring image regions of each image tile, parameters of the additional machine-learning models can be learned based on features of a particular image tile of the image but also features of neighboring tiles of the same image. Thus, the additional machine-learning model can be trained using information corresponding to the dependencies between a target image tile and its neighboring image tiles. In some instances, the additional machine-learning models include recurrent neural networks (e.g., gated recurrent neural networks) and long short term memory.

The second machine-learning model can be trained such that it: (i) replaces the machine-learning model with the set of convolutional layers (e.g., a convolutional neural network); (ii) is used before or after the execution of the machine-learning model; and/or (iii) is integrated into the machine-learning model.

Recurrent neural networks include a chain of repeating modules ("cell") of a neural network. Specifically, an operation of an recurrent neural network includes repeating a single cell indexed by a position of a target image tile (t). In order to provide its recurrent behavior, a recurrent neural network maintains a hidden state $s_t$, which is provided as input to the next iteration of the network. The hidden state can be a vector or a matrix that represents information from a neighboring image tile. As referred herein, variables $s_t$ and $h_t$ are used interchangeably to represent a hidden state of the recurrent neural network. The recurrent neural network receives a feature representation for the target image tile $x_t$ and a hidden state value $s_{t-1}$ determined using sets of input features of neighboring image tiles. In some instances, the feature representation of the target image tile $x_t$ is generating using the machine-learning model with the set of convolutional layers. The following equation provides how the hidden state $s_t$ is determined:

$$s_t = \varphi(Ux_t + Ws_{t-1}),$$

where U and W are weight values applied to $x_t$ and $s_{t-1}$ respectively, and $\varphi$ is a non-linear function such as tanh or ReLU.

As shown, the $s_t$ value generated based on applying $Ux_t$ and $Ws_{t-1}$ can be used as the hidden state value for the next iteration of the recurrent neural network which processes features corresponding to a subsequent image tile.

The output of the recurrent neural network is expressed as:

$$o_t = \text{softmax}(Vs_t),$$

where V is a weight value applied to the hidden state value $s_t$.

Thus, the hidden state $s_t$ can be referred to as the memory of the network. In other words, the hidden state $s_t$ depends from information associated with inputs and/or outputs used or otherwise derived from one or more previous image tiles. The output at step $o_t$ is a set of values used to identify the artifact pixels, which is calculated based at least in part on the memory at the target image tile position t.

Figure 19:
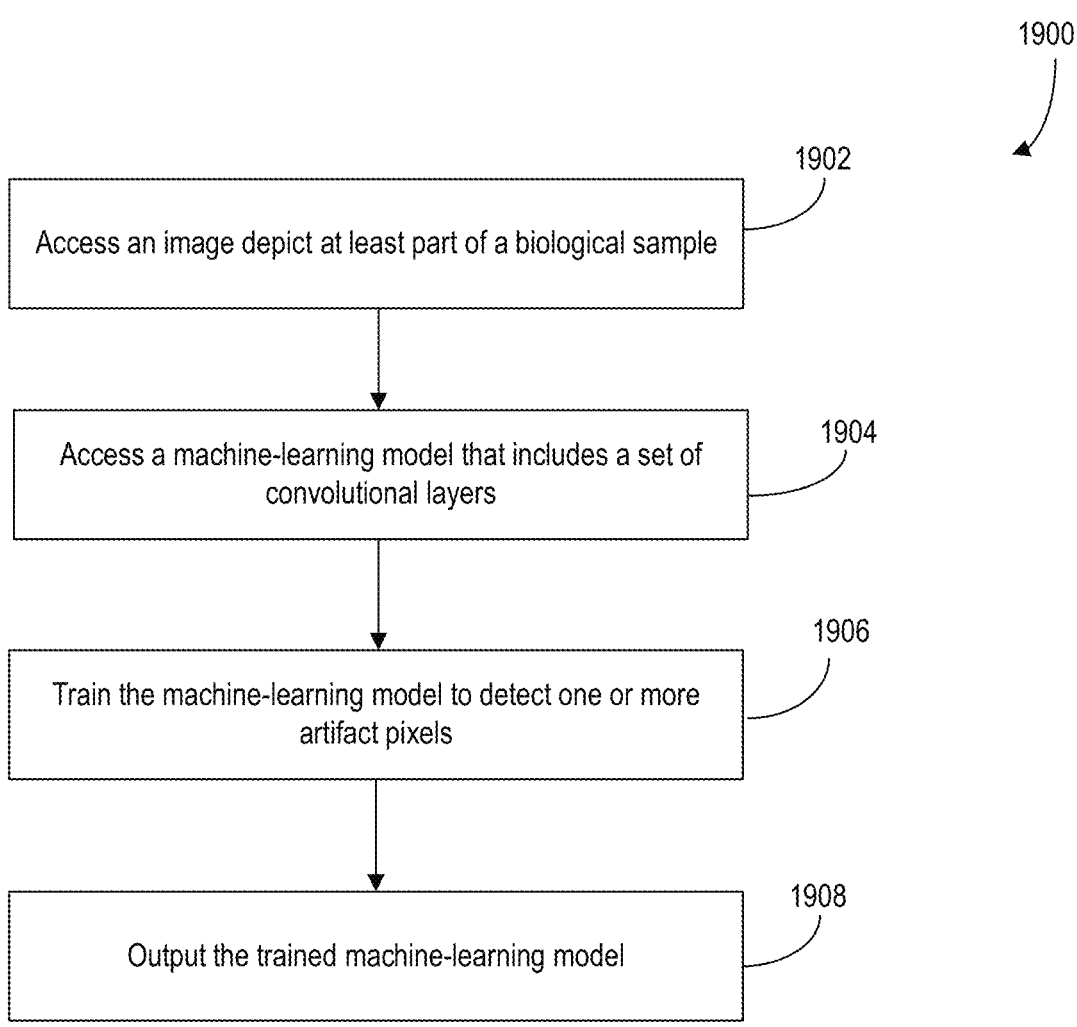
FIG. 19 shows a flowchart illustrating an example process for training a machine-learning model to accurately detect artifact pixels, according to some embodiments.

C. Process for Training a Machine-Learning Model to Accurately Detect Artifact Pixels FIG. 19 shows a flowchart illustrating an example process 1900 for training a machine-learning model to accurately detect artifact pixels, according to some embodiments. At step 1902, a training image depicting at least part of a biological sample can be accessed. The training image includes a plurality of labeled pixels, in which each labeled pixel of the plurality of labeled pixels is associated with a label. The label predicts whether the corresponding pixel accurately depicts a corresponding point or region of the at least part of the biological sample. For example, a pixel depicting an out-of-focus region of the biological sample can be labeled as not accurately depicting the corresponding region (e.g., a part of a tissue section).

In some instances, the training image is converted into a greyscale image. The greyscale image is used to train a machine-learning to detect artifact pixels. Additionally or alternatively, the training image is converted to the pre-processed image by transforming its pixels from a first color space (e.g., RGB) into a second color space (e.g., L*a*b). A first color channel in the second color space (e.g., L channel) can be extracted and used to train the machine-learning model to detect the artifact pixels. Converting to a different color space can eliminate non-informative color information from artifact-detection modeling and enforces the machine-learning model to learn discriminative image features independent of complex color variations and heterogeneous staining patterns mostly irrelevant to artifacts.

At step 1904, a machine-learning model that includes a set of convolutional layers can be accessed. For example, the machine-learning model is a U-Net architecture. In some instances, the machine-learning model is configured to apply each convolutional layer of the set of convolutional layers to a feature map representing an input image.

At step 1906, the machine-learning model is trained to detect one or more artifact pixels in images at a target image resolution. An artifact pixel of the one or more artifact pixels is predicted to not accurately depict a point or region of the at least part of the biological sample. For example, the artifact label can be predictive of a presence of an artifact (e.g., blur, tissue fold, foreign object) that may result in the pixel not accurately depicting the corresponding region of the biological sample.

In some instances, a set of image features are used with the training image to train the machine-learning model. For example, the set of image features can include a matrix of image-gradient values. The matrix of image-gradient values can identify, for each pixel of the training image, an image gradient value of the pixel. An image-gradient value indicates whether the corresponding pixel corresponds to an edge of an image object. In some instances, the matrix of image-gradient values is determined by applying Laplacian of Gaussian (LoG) filters to the training image.

The training of the machine-learning model can include learning of parameters of the machine-learning model based on a loss value calculated for each pixel. For each labeled pixel of the plurality of labeled pixels of the training image, the training can include determining a first loss of the labeled pixel at the first image resolution by applying a first convolution layer of the set of convolutional layers to a first feature map representing the training image at a first image resolution. Then, a second loss of the labeled pixel at the second image resolution can be determined by applying a second convolution layer of the set of convolutional layers to a second feature map representing the training image at a second image resolution. In some instances, the second resolution has a higher image resolution relative to the first image resolution.

The training can further include determining a total loss for the labeled pixel based on the first loss and the second loss. The total loss can be used to determine that the machine-learning model has been trained to detect the one or more artifact pixels at the target image resolution.

At step 1908, the trained machine-learning model is outputted. The trained machine-learning model can be used by another system to detect artifacts in other images with distinct staining patterns. Process 1900 terminates thereafter.

D. Training a Machine-Learning Model to Predict Two or More Types of Artifacts

In some instances, a machine-learning model is trained using the three-class tissue fold masks (e.g., the three-class tissue-fold mask 804 of FIG. 8) to identify two or more types of artifacts for at least a portion of a given slide image (e.g., FOV). For example, the machine-learning model can be trained to detect a first set of pixels corresponding to blurry regions and a second set of pixels corresponding to tissue folds. To train the multi-classification model, pixels of each training image can be labeled as one or more of "tissue regions", "non-analysis regions" that correspond to blurry regions, and "non-analysis tissue" that correspond to tissue-fold regions within the tissue regions.

Figure 20:
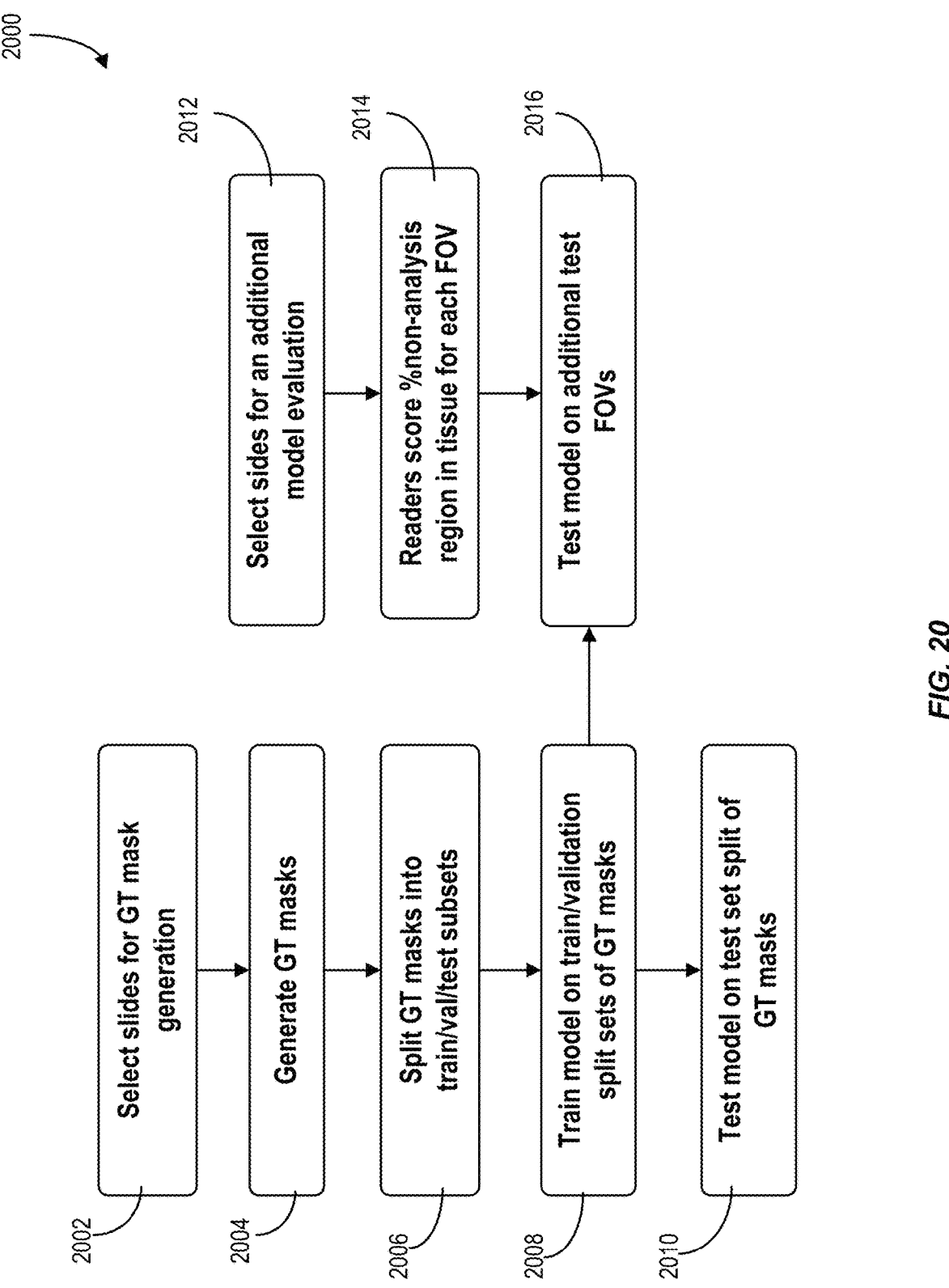
FIG. 20 illustrates a flowchart that shows a process for training a machine-learning model for detecting artifact regions in a slide image, according to some embodiments.

The multi-classification model can first be trained to detect and segment artifact regions. FIG. 20 illustrates a flowchart that shows a process 2000 for training a machine-learning model for detecting artifact regions in a slide image, according to some embodiments. In FIG. 20, a first training stage can be implemented for training a machine-learning model to detect artifact regions depicted slide images, and a second training stage can be implemented to perform evaluation of the performance of the machine-learning model. For the first training stage, a set of slides can be selected for generating the ground-truth masks (step 2002). At step 2004, a first set of training images can be generated. The first set of training images can include segmentation masks that identify two or more types of artifacts. The process for generating the first set of training images can include the process 700 of FIG. 700. At step 2006, the first set of training images can be split into model training, validation, and testing data sets. At step 2008, the machine-learning model can be trained using the first set of training images. The steps for training the machine-learning model using the first set of training images are further described in the process 1900 of FIG. 19. At step 2010, segmentation performance of the machine-learning model can be tested based on performance scores, such as precision, recall and so on.

For the second training stage, an additional set of slides can be selected (step 2012). In some instances, the additional set of slides include slides from unseen tissue types, biomarkers, and chromogens. The additional set of slides can be different from those used in the first training stage, since the aim is to have a separate set of slides to pressure test the model performance in order to assess its generalizability to unseen images, chromogen (combinations), biomarkers and tissue types. In some instances, FOVs are selected from the additional set of slides. The second set of training images can then be generated based on the additional set of slides. At step 2014, labels can be assigned to pixels of each training image of the second set of training images. The labels can be assigned by receiving two types of readout from annotators. A first type of readout can include whether or not there are tissue folds in the FOV, and a second type of readout can include a percentage of non-analysis tissue in the tissue area in each selected FOV. At step 2016, the machine-learning model can be trained and tested using the second set of training images, for independent testing of model generalizability. In some instances, the annotated percentages are compared with model predictions as a proxy for model generalizability. As a result, the machine-learning model can be trained and tested for detecting artifact regions in other slide images.

IV. Implementing Machine-Learning Models to Detect Artifact Pixels in Images

Due to the large sizes of whole-slide images, automated digital pathology analysis needs to be performed as efficiently as possible without sacrificing accuracy. Typically, digital pathology analysis (e.g., a cell classification model) can include generating a set of image tiles from a whole-slide image, in which an image tile can represent a portion of the image having a particular size and dimensions (e.g., 20×20 pixels). The cell classification (for example) can then be performed for each image tile to generate a corresponding prediction result, which can be followed by assembling prediction results back into the whole-slide image resolutions.

Applying quality control to digital pathology analyses can thus result in doubling the processing time. However, performing slide quality control at the same resolution as the main digital pathology analysis, usually at 20× or 40× resolution, is not necessary. This is because many types of artifacts can be identified at a lower image resolution. Furthermore, large artifacts, such as large tissue folds, cannot fit into an image tile at a high resolution. Thus, in some instances, performing quality control at high image resolution causes inconsistent results.

To increase efficiency in implementing artifact-detection into digital pathology analysis, some embodiments include using different image resolutions for detecting artifact pixels in an image. A set of training images can be obtained. For each training image, labels corresponding to respective pixels can be collected at a high image resolution (e.g., 40×, 20×, 10×). An artifact-detection machine-learning model (e.g., the U-Net machine-learning model of FIG. 18) is trained using the set of training images. The machine-learning model is further trained and tested using images at lower image resolutions to determine a target image resolution. At the target image resolution, the machine-learning model can maintain accuracy in detecting artifact pixels while increasing efficiency. For example, if the machine-learning model can be trained to detect artifact pixels within tolerance levels of accuracy at 5×, then the target resolution can be determined to be 5× and it is not necessary to apply the machine-learning model to detect artifact pixels at higher image resolutions (e.g., 10×, 20×). In this manner, inference time can be reduced by 16-fold comparing to another machine-learning model detecting artifact pixels at 20× image resolution (for example).

A. Process for Integrating Artifact-Detection to Digital Pathology Analysis

FIG. 21 shows a flowchart illustrating an example process 2100 for using a trained machine-learning model to accurately detect artifact pixels, according to some embodiments. At step 2102, an image depicting at least part of a biological sample is accessed. For example, the image can be a slide image depicting a tissue slice of a particular organ. The biological sample can include a tissue section stained using a staining protocol of a particular type of IHC assay. In some instances, the image is at a first image resolution (e.g., 40×).

At step 2104, a machine-learning model trained to detect artifact pixels in images at a second image resolution is accessed. The machine-learning model can be a machine-learning model having a set of convolutional layers (e.g., a U-Net). In some instances, the first image resolution of the image (e.g., 40×) has a higher image resolution relative to the second image resolution (e.g., 5×).

At step 2106, the image is converted to generate a converted image that depicts the at least part of the biological sample at the second image resolution. For example, one or more image-resolution modification algorithms can be used to change image resolution and generate the converted image, including mipmapping, nearest-neighbor interpolation, and Fourier transformation.

At step 2106, the machine-learning model is applied to the converted image to identify one or more artifact pixels from the converted image. An artifact pixel of the one or more artifact pixels is predicted to not accurately depict a point or region of the at least part of the biological sample. For example, the artifact pixel can be predicted to depict a part of a blurry portion of a given image or depict a part of a foreign object shown in the image.

At step 2108, an output that includes the one or more artifact pixels is generated. In some instances, the output includes an artifact mask identifying the artifact pixels at pixel-level accuracy. The artifact mask can be used to identify portions of the image corresponding to various classes (e.g., non-blurry tissue, blurry tissue, non-tissue). Additionally or alternatively, the output indicates an amount of artifact pixels (e.g., a percentage of artifact pixels to a total number of pixels in the image). For example, the estimated amount may include a count of predicted artifact pixels, a cumulative area corresponding to multiple or all artifact pixels, a percentage of a slide area or tissue area that corresponds to predicted artifact pixels, etc. Process 2100 terminates thereafter.

In some instances, a predicted artifact (e.g., an artifact depicted by one or more artifact pixels) in the image is classified into one of the following categories: (a) a first artifact category in which the artifact is generated only during slide scanning; and (b) a second artifact category in which the artifact is generated at any time point (e.g., experiments, staining). If the predicted artifact corresponds to the first artifact category, the digital pathology analysis can proceed without further quality-control operations. If the predicted artifact corresponds to the second artifact category, an alert is generated to the user prompting whether the image should be rejected and/or the biological sample should be rescanned to generate another image depicting the biological sample. In some instances, a graphical user interface is configured to allow the user to reject the image. Additionally or alternatively, a quality control algorithm can be designed for each predicted type of artifact. The quality control algorithm for a predicted type of artifact can output a result that triggers rejection of the image and/or rescanning of the biological sample.

B. Configurations for Performing Quality Control

It is not uncommon that some artifacts (e.g., blurry image portions) can be present in a slide image. From the perspective of user experience, scanned slides with large amounts of artifacts caused during scanning is not desirable. In addition, considering the large sizes of histology slides, digitizing every slides with apparent quality issues can result in additional storage space and increased scanning time. This problem can become more significant for large-scale projects and in cases where scanning speed is sub-optimal. Therefore, artifact detection at the scanning phase can considered as an alternative to performing the artifact detection after slide digitization.

1. Pre-Processing Slide Images

In some instances, image pre-processing is applied to an image before the machine-learning model is applied to the image for detecting artifact pixels. For example, a preview image (e.g., a thumbnail image) can be initially captured by the scanning device by scanning a slide depicting a biological sample. An image pre-processing algorithm such as a blur detection algorithm can be applied to the preview image. If tissue regions are detected in the preview image, an initial image depicting the biological sample can be scanned. The initial image can depict the biological sample at the target image resolution.

As an illustrative example, a slide of a biological sample can be scanned at thumbnail resolution (e.g., 1.25×) or at another low resolution to generate a preview image. The low resolution of the preview image allows scanning time to be within a predetermined time threshold. The predetermined time threshold can be selected from various time values, such as 10 seconds, 15 seconds, 20 seconds, or any higher value. Image pre-processing can be applied to the preview image to identify image portions predicted to depict one or more tissue regions of the biological sample. If no tissue regions are identified, the quality control process terminate. If one or more tissue regions are identified, the machine-learning model can be applied to the image captured at a relatively higher resolution (e.g., 4×).

2. Artifact Detection During Scanning of Images

Scanning systems for digital pathology typically include line scanners and tile-based area scanners. In a line scanner system, line sensors can perform image acquisition one line/stripe at a time, in which the line can be one-pixel wide and has a length specified by the design of sensors in the system. After scanning is complete for a whole slide, the acquired image data from the line scans can be reorganized into image tiles according to locations the pixels that correspond to those of the slide. These image tiles can then stitched into the whole-slide image. In a tile-based scanner system, area sensors perform image acquisition one tile at a time, which corresponds to a rectangular field of view.

In both types of scanner systems, image tiles can be generated during scanning, at which the machine-learning model can be applied to detect artifact pixels. With respect to a line scanner, the image data acquired from line sensors are not image tiles. Thus, the scanned data can be generated every few line sweeps. The scanned data can then be reorganized into image tiles, at which the machine-learning model is applied to the image tiles to detect artifact pixels. In some instances, processing can be performed using hardware components (e.g., FPGA) and/or software components.

Artifact detection during scanning can enable scanners or scanner-associated software to warn users of slide quality issues during scanning (e.g., artifact types, localization of artifacts, size of artifacts), such that users can make decision of saving or deleting a particular scan. Additionally or alternatively, artifact detection during scanning can be used by scanners to intelligently and automatically adjust settings in response to detection of predicted artifacts. For example, autofocusing parameters can be adjusted by the scanner in response to determining a presence of artifact pixels over a portion of the image depicting a tissue region of the biological sample or determining that the amount of artifact pixels exceeds an artifact-area threshold.

(a) Artifact Detection by Initially Scanning at Low Image Resolution

For slides with detectable tissue regions, the machine-learning model can be applied to the image to generate an image mask identifying the artifact pixels and identify an amount of artifact pixels present in the image. In some instances, artifact-detection can be performed at a low image resolution. Low-resolution artifact detection can be used to detect artifact pixels that are predicted to depict artifacts that occupy a large portion of an image, including large tissue folds, large blurry regions caused by tissue folds, and so on.

For example, a machine-learning model can be trained to detect artifacts at a target image resolution. During scanning, a first scanned image of the slide depicting the biological sample can be performed at the target image resolution. The machine-learning model can be applied to the first scanned image to identify one or more artifact pixels. An amount of the artifact pixels can be determined. A value representing the amount of artifact pixels can be compared against an artifact-area threshold. In some instances, the artifact-area threshold corresponds to a value that represents a relative size of an image portion (e.g., 40%, 50%, 60%, 70%, 80%, 90%) within the image. The artifact-area threshold can be selected by a user. If the amount of artifact pixels exceeds the artifact-area threshold, it can be predicted that one or more artifacts occupy a large portion within the image, thus likely causing performance degradation of subsequent digital pathology analyses (e.g., cell-classification). If it is determined that the value representing the amount of artifact pixels exceeds the artifact-area threshold, possible quality-control failure can be determined. In some instances, an alert is generated in response to determining the quality-control failure.

Additionally or alternatively, an image mask (alternatively referred to as an "artifact mask") that includes the one or more artifact pixels can also be generated. The artifact mask can be used by the graphical user interface such that it overlays the image, thus identifying portions of the image that are predicted to include artifacts. This allow users to decide whether to rescan the slide or reject the image (e.g., the user may redo experiments to generate another image with better image quality).

If it is determined that the value representing the amount of artifact pixels is under the artifact-area threshold, the biological sample can be scanned at a higher image resolution for digital pathology analysis. In some instances, scanning at the higher image resolution includes switching magnification such as using a different objective or changing the tube lens of a scanner. Both operations may include moving optical elements.

Switching resolutions can include scanning two passes through the slide, which requires additional scanning time. By initially scanning at low resolution, the additional scanning time can be minimized since initial scanning speed can be faster than the time required to scan the slide at the target image resolution. For example, scanning at 5× resolution can generate $\frac{1}{16}$ the number of pixels comparing to scanning at 20× resolution. Such difference can imply that only a small portion of the time is needed for scanning at 5×. In another example, with a line scanner, if the length of the stripes/lines is large enough to cover the width (or height) of a given slide at low resolution, a single sweep through the slide can complete the scanning, thereby minimizing the increase of the total scanning time.

(b) Artifact Detection by Converting the Scanned Image to a Lower Image Resolution In some instances, the machine-learning model is applied to a slide image after scanning the biological sample at a high image resolution, then converting the slide image to a lower image resolution. The artifact detection can be performed on the slide image before the slide image is further processed (e.g., stored at another database for further digital pathology analysis). Such a design can facilitate early exclusion of poor quality scans before other time-consuming processes take place (e.g., data transfer, long-term data storage). With recent advances of computational hardware and software algorithms, such implementation is feasible as the time for processing a whole-slide image at 20× resolution (for example) may be completed within tens of seconds.

For example, a slide depicting the biological sample can be scanned at a higher image resolution to generate an initial image. The machine-learning model for detecting artifacts can be applied to a converted image to identify one or more artifact pixels. The converted image can be generated by converting the initial image into an image with a lower image resolution. An amount of the artifact pixels can be determined. A value representing the amount of artifact pixels can be compared against an artifact-area threshold. If it is determined that the value exceeds the artifact-area threshold, possible quality-control failure can be determined. In some instances, an alert is generated in response to determining the quality-control failure. Additionally or alternatively, an artifact mask that includes the one or more artifact pixels can also be generated, to allow users to rescan the slide or reject the image (e.g., the user may redo experiments to generate another image with better image quality).

If it is determined that the value is under the artifact-area threshold, the initial image scanned at the high image resolution can be accepted and stored directly in a DICOM format and/or in another file format. In some instances, information corresponding to the artifact pixels (e.g., locations of the artifact pixel in the initial image, an artifact mask of the same resolution as the initial image or of a lower image resolution, etc.) are stored along with the initial image and/or in another file format separate from the initial image. Subsequent digital pathology analysis can also be performed for the initial image.

(c) Artifact Detection Per Image Tile-Basis

In some instances, the machine-learning model can be applied to a slide image per image-tile basis. The slide image can be divided into a set of image tiles. The machine-learning model can be applied to each image tile of the set of image tiles to generate the image mask. The image mask identifies a subset of image tiles, in which each image tile of the subset of image tiles can depict one or more artifact pixels. The image mask can then be applied to the image to allow the user to unselect one or more image tiles of the subset of image tiles, at which the unselected image tiles are excluded from further digital pathology analysis. Additionally or alternatively, the image mask can be applied to the image, at which the subset of image tiles of the image are selected without user input and then excluded from further digital pathology analysis.

As an illustrative example, a part of a slide of a biological sample can be scanned to obtain a corresponding portion of the image (e.g., an image tile). The image tile can be scanned at a target image resolution. After image tile is obtained, the machine-learning model is applied to the image tile to identify one or more artifact pixels (e.g., batch size=1). In some instances, the machine-learning model is applied to multiple image tiles to identify artifact pixels for each image tile (e.g., batch size ≥1). The processing of multiple image tiles can be performed based on multi-processing with GPU or CPU.

For each image tile with the identified artifact pixels, additional processing can be performed. The additional processing of the image tile with artifact pixels can include: (i) determining an amount of artifact pixels identified in the image tile (e.g., a percentage of artifact pixels over a total number of pixels); and (ii) determining an amount of pixels depicting tissue regions (e.g., a percentage of pixels that depict tissue regions over the total number of pixels). The additional processing can be performed while additional images tiles of the image are being scanned and processed by the machine-learning model. In some instances, the image tile is initially downsampled to depict the biological sample at a lower image resolution, at which the machine-learning mode is applied to identify the artifact pixels.

If the amount of artifact pixels determined from the image tile exceeds an artifact-area threshold, an alert can be generated to warn a user that the image tile is predicted to not accurately depict a corresponding point or region of the biological sample. In some instances, an artifact mask is generated in response to the above determined.

If the amount of artifact pixels depicting tissue regions under the artifact-area threshold, the entire slide can be scanned at a target resolution for subsequent digital pathology analysis. Additionally or alternatively, a scanning system used for generating image tiles (e.g., a tile-based scanner, a line-based scanner) can be configured to modify its settings based on detecting the artifact pixels. In some instances, the modification of settings include, for an artifact corresponding to a blurry image portion: (i) comparing focus quality of scanned/assembled image tiles at multiple z-planes; (ii) excluding image tiles at z-planes in which artifact pixels were identified and/or adjust z-planes to reduce artifacts. Such configurations can either be integrated with or replace existing auto-focusing systems in scanners.

3. Additional Artifact Detections

In some instances, post-scan artifact detection can be performed in addition to artifact detection of images during scanning. Post-scan artifact detection can further improve accuracy of detecting artifacts in images. For example, algorithms for artifact detection during scanning can either be designed specific to downstream digital pathology analysis or designed to apply to other generic algorithms. In cases where integrating a customized artifact detection algorithm into scanners is not practical, post-scan artifact detection can be used to maintain quality control of whole-slide images for downstream digital pathology analysis.

In another example, with respect to artifact detection at a low image resolution, scanning later at a higher image resolution may generate new or different artifacts. In particular, out-of-focus image portion can be different between these two scans, because different objectives or tube lenses can be used and the scans can come from separate scanning runs. Thus, without post-scan artifact detection, there could be new artifacts that can reduce accuracy in downstream digital pathology analysis.

In some instances, post-scan artifact detection is more effective for certain types of machine-learning models. For example, post-scan artifact detection can be more effective when a particular machine-learning model (e.g., a recurrent neural network) integrates features from neighboring image tiles. Although image data generated during scanning can be organized during scanning to assess neighboring image tiles, such approach may slow down the scanning speed and/or considerably increase the burden of computation for the hardware integrated or associated with scanners.

V. Experimental Results

An evaluation was performed to identify performance levels of the machine-learning model for detecting artifacts in a slide image.

A. Dataset

A set of labels for identifying pixels were collected from each of 50 whole-slide images. A label for a corresponding pixel was associated with one of three types of classes: non-tissue; blurry-tissue; and non-blurry tissue. The whole-slide images depict at least part of biological samples obtained from two cohorts (breast cancer and lung cancer). Each biological sample was stained with one of the following: (1) hematoxylin; (2) singleplex staining for ER, PR, PDL1 or CK7; and (3) duplex staining for ER/PR or PDL1/CK7. The chromogens of the assays were Dabsyl (yellow), Tamra (purple), SRB (red) or DAB (only in singleplex IHC). The whole-slide images for independent testing were from various tissue types (breast, lung, liver, kidney and colon) and from singleplex, duplex and triplex assays (additional chromogen: Teal, additional biomarkers: LIV1, HER2, CD8 and BCL1).

From the 50 whole-slide images, 978 image tiles were selected, in which each image tile had 512×512 pixel in size and scanned at 5× image resolution. From the selected image tiles, 462 image tiles were used for training, 246 image tiles for validation, and 270 image tiles for testing. Additional 100 whole-slide images were selected for independent testing.

B. Model Selection and Configuration

Two modified U-Net machine-learning models were selected for evaluation. For a first machine-learning model, the number of channels in the intermediate convolutional layers were reduced by a factor of 2, thereby resulting in Model 1 (7.76 million parameters). For a second machine-learning model, the number of channels in the intermediate convolutional layers were reduced by a factor of 4, thereby resulting in Model 2 (1.94 million parameters).

C. Image Pre-Processing and Training

Each of the selected image tiles was converted to grayscale and augmented with random rescaling, flipping, contrast jittering, and intensity jittering. Each grayscale, augmented image tile was concatenated with its corresponding image gradient map (Laplacian filtering with a kernel size of 3 followed by Gaussian filtering with a kernel size of 25 and sigma of 3). The grayscale, augmented image tiles with corresponding gradient features were used to train each of the two U-Net models. The training of the two U-Net models was performed using the multi-resolution training technique described in Section III. In particular, losses calculated from each of the last two processing blocks at the expansive path were utilized for pixel-level classification.

D. Results

Figure 22:
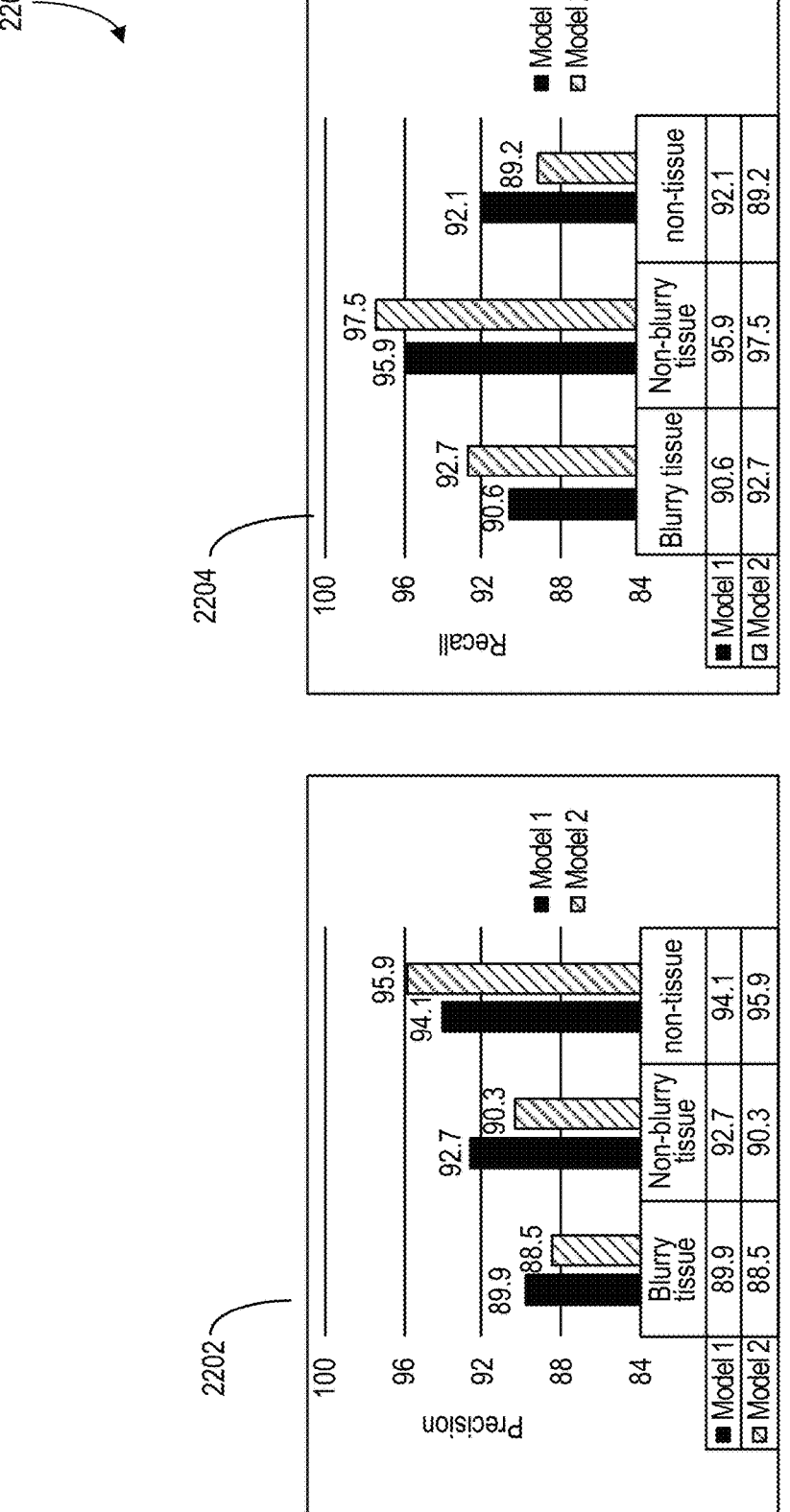
FIG. 22 shows an example set of graphs that identify precision and recall scores of machine-learning models trained to detect artifact pixels.

FIG. 22 shows an example set of graphs 2200 that identify precision and recall scores of machine-learning models trained to detect artifact pixels. A graph 2202 shows the precision scores corresponding to Model 1 and Model 2, and a graph 2204 shows the accuracy scores corresponding to Model 1 and Model 2. The precision and recall scores for each graph 2202 and 2204 were calculated based on the held-out test images with corresponding labels. Note that the performance of Model 1 and Model 2 are similar in detecting artifacts. This can imply that that a machine-learning model with relatively fewer parameters (e.g., 1.94 million parameters) can be sufficiently effective in detecting artifacts.

Figure 23:
FIG. 23 shows an example set of image masks generated for a set of unseen images from the same type of assays and same type of tissues as the training images.

FIG. 23 shows an example set of image masks 2300 generated for a set of unseen images from the same type of assays and same type of tissues as the training images. Each image depicts a tissue section stained using a staining protocols corresponding to a particular type of IHC assay. In FIG. 23, predicted image masks 2302 generated from Model 2 are presented as well as ground-truth image masks 2304. A comparison between the predicted image masks 2302 and ground-truth image masks 2304 show that the ability of Model 2 to accurately identify artifact pixels.

Figure 24:
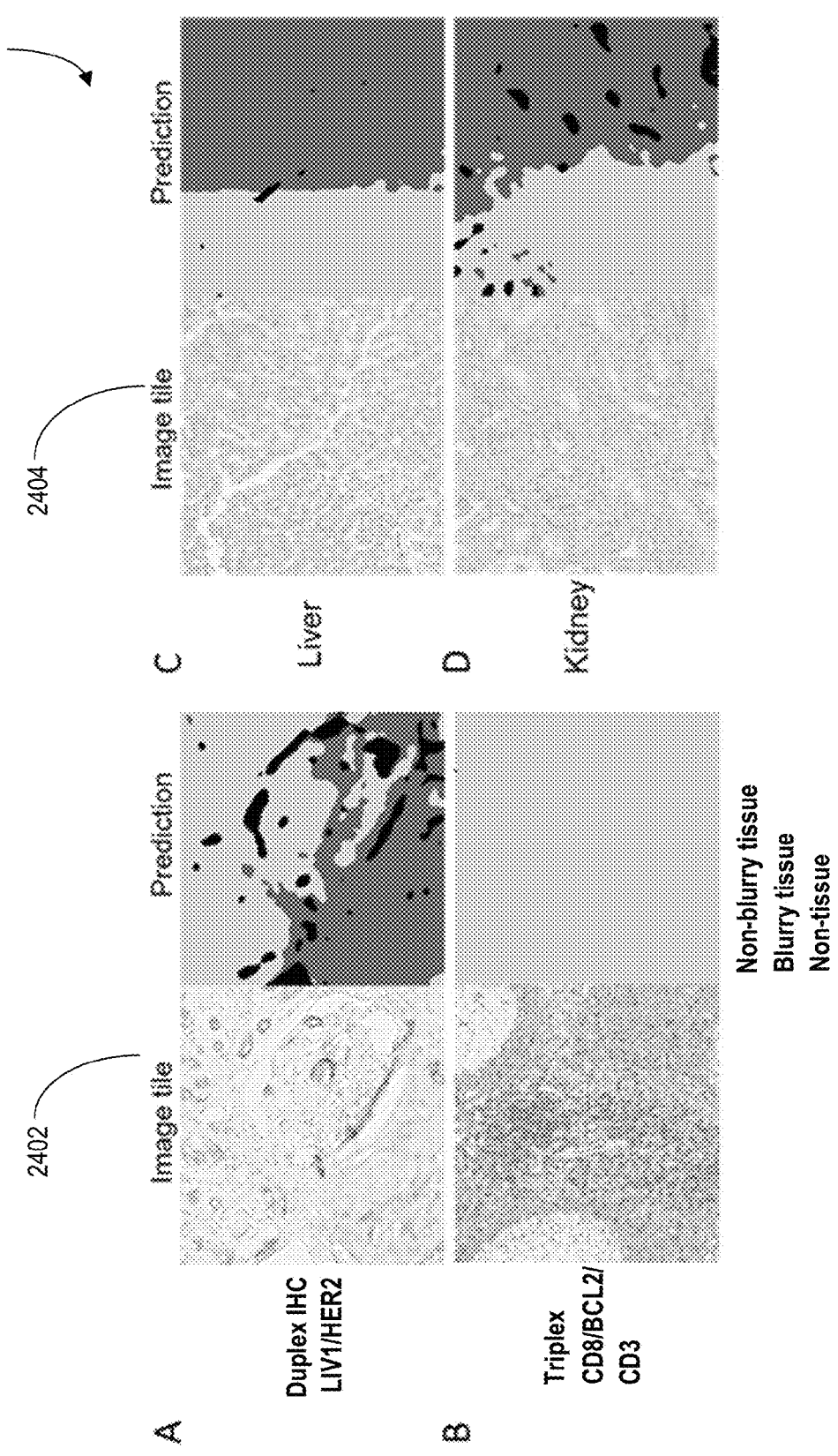
FIG. 24 shows an example set of image masks generated from images depicting unseen assay patterns or types of tissues.

In addition, the trained machine-learning model was applied to independent test images (i.e., the set of 100 whole-slide images identified in Section V.A) to identify artifact pixels. For example, FIG. 24 shows an example set of image masks 2400 generated from images depicting unseen assay patterns or types of tissues. FIG. 24 can be used for qualitative assessment of machine-learning model generalizability of out-of-focus artifact detection to unseen assay and unseen tissue types.

As shown in FIG. 24, the example image masks demonstrate accurate artifact detection from unseen assays 2402 and unseen tissue types 2404. The image masks further indicate that the trained machine-learning model can perform accurate artifact detection across images depicting various types of biological sample and/or biological samples stained using staining protocols corresponding to different types of assays.

VI. Computing Environment

FIG. 25 illustrates an example of a computer system 2500 for implementing some of some embodiments disclosed herein. The computer system 2500 may include a distributed architecture, where some of the components (e.g., memory and processor) are part of an end user device and some other similar components (e.g., memory and processor) are part of a computer server. In some instances, the computer system 2500 is a computer system for determining a gene signature of a subject based on size distributions of nucleic acid molecules of a biological sample, which includes at least a processor 2502, a memory 2504, a storage device 2506, input/output (I/O) peripherals 2508, communication peripherals 2510, and an interface bus 2512. The interface bus 2512 is configured to communicate, transmit, and transfer data, controls, and commands among the various components of computer system 2500. The processor 2502 may include one or more processing units, such as CPUs, GPUs, TPUs, systolic arrays, or SIMD processors. Memory 2504 and storage device 2506 include computer-readable storage media, such as RAM, ROM, electrically erasable programmable read-only memory (EEPROM), hard drives, CD-ROMs, optical storage devices, magnetic storage devices, electronic non-volatile computer storage, for example, Flash® memory, and other tangible storage media. Any of such computer-readable storage media can be configured to store instructions or program codes embodying aspects of the disclosure. Memory 2504 and storage device 2506 also include computer-readable signal media.

A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 2500.

Further, the memory 2504 includes an operating system, programs, and applications. The processor 2502 is configured to execute the stored instructions and includes, for example, a logical processing unit, a microprocessor, a digital signal processor, and other processors. For example, the computing system 2500 can execute instructions (e.g., program code) that configure the processor 2502 to perform one or more of the operations described herein. The program code includes, for example, code implementing the analyzing the sequence data, and/or any other suitable applications that perform one or more operations described herein. The instructions could include processor-specific instructions generated by a compiler or an interpreter from code written in any suitable computer-programming language, including, for example, C, C++, C#, Visual Basic, Java, Python, Perl, JavaScript, and ActionScript.

The program code can be stored in the memory 2504 or any suitable computer-readable medium and can be executed by the processor 2502 or any other suitable processor. In some embodiments, all modules in the computer system for predicting loss of heterozygosity in HLA alleles are stored in the memory 2504. In additional or alternative embodiments, one or more of these modules from the above computer system are stored in different memory devices of different computing systems.

The memory 2504 and/or the processor 2502 can be virtualized and can be hosted within another computing system of, for example, a cloud network or a data center. I/O peripherals 2508 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 2508 are connected to the processor 2502 through any of the ports coupled to the interface bus 2512. The communication peripherals 2510 are configured to facilitate communication between the computer system 2500 and other computing devices over a communications network and include, for example, a network interface controller, modem, wireless and wired interface cards, antenna, and other communication peripherals. For example, the computing system 2500 is able to communicate with one or more other computing devices (e.g., a computing device that determines a gene signature of a subject based on size distributions of nucleic acid molecules of a biological sample, another computing device that generates sequence data of a biological sample of the subject) via a data network using the a network interface device of the communication peripherals 2510.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Certain embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an openended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:
accessing an image depicting at least part of a biological sample;
applying an image pre-processing algorithm to the image to generate a pre-processed image, wherein the pre-processed image includes a plurality of labeled pixels, and wherein each labeled pixel of the plurality of labeled pixels is associated with a label predicting whether the pixel accurately depicts a corresponding point or region of the at least part of the biological sample;
applying a machine-learning model to the pre-processed image to identify one or more labeled pixels from the plurality of labeled pixels, wherein the one or more labeled pixels are predicted to have been erroneously labeled by the image pre-processing algorithm;
modifying a label of each of the one or more labeled pixels;

generating a training image that includes at least the one or more labeled pixels with the modified labels; and
outputting the training image.

2. The method of claim 1, wherein the label further identifies a type of artifact, wherein the pixel is further predicted to depict at least part of an artifact corresponding to the type of artifact.

3. The method of claim 1, further comprising:
applying a blur threshold to each labeled pixel of the plurality of labeled pixels;
determining, based on applying the blur threshold, that an additional labeled pixel of the plurality of labeled pixels has been erroneously labeled; and
modifying a label corresponding to the additional labeled pixel.

4. The method of claim 3, wherein the blur threshold is determined based on performance of a downstream algorithm on a set of z-axis images depicting the at least part of a biological sample across a depth dimension.

5. The method of claim 1, wherein the image pre-processing algorithm includes image segmentation, morphological operation, image thresholding, image filtering, image contrast enhancement, blur detection, or combination thereof.

6. The method of claim 1, wherein the label further predicts whether the pixel depicts at least part of an artifact associated with a particular artifact type.

7. The method of claim 6, wherein the particular artifact type includes a blurry region, a tissue fold, and a foreign object.

8. A method comprising:
accessing an image depicting at least part of a biological sample;
applying an image pre-processing algorithm to the image to generate a pre-processed image, wherein the pre-processed image includes a plurality of labeled pixels, and wherein each labeled pixel of the plurality of labeled pixels is associated with a label predicting whether the pixel accurately depicts a corresponding point or region of the at least part of the biological sample;
applying a machine-learning model to the pre-processed image to identify one or more labeled pixels from the plurality of labeled pixels, wherein the one or more labeled pixels are predicted to have been erroneously labeled by the image pre-processing algorithm;
modifying a label of each of the one or more labeled pixels;
generating a training image that includes at least the one or more labeled pixels with the modified labels
training a machine-learning model that includes a set of convolutional layers to detect one or more artifact pixels in images at a target image resolution, wherein the machine-learning model is configured to apply each convolutional layer of the set of convolutional layers to a feature map representing an input image, wherein an artifact pixel of the one or more artifact pixels is predicted to not accurately depict a point or region of the at least part of the biological sample, and wherein training the machine-learning model includes:
for each labeled pixel of the plurality of labeled pixels of the training image:
determining a first loss of the labeled pixel at a first image resolution by applying a first convolution layer of the set of convolutional layers to a first feature map representing the training image at the first image resolution, determining a second loss of the labeled pixel at a second image resolution by applying a second convolution layer of the set of convolutional layers to a second feature map representing the training image at a second image resolution, wherein the second image resolution has a higher image resolution relative to the first image resolution, determining a total loss for the labeled pixel based on the first loss and the second loss, and determining, based on the total loss, that the machine-learning model has been trained to detect the one or more artifact pixels at the target image resolution; and outputting the machine-learning model.

9. The method of claim 8, further comprising converting the training image to a greyscale training image, wherein the machine-learning model is trained using the greyscale training image.

10. The method of claim 8, further comprising converting the plurality of labeled pixels of the training image from a first color space to a second color space to generate a modified training image, wherein the machine-learning model is trained using the modified training image.

11. The method of claim 8, wherein the total loss is determined based on a sum of the first loss and the second loss.

12. The method of claim 8, wherein the total loss is determined based on an average between the first loss and the second loss.

13. The method of claim 8, wherein the target image resolution is the first image resolution.

14. A method comprising:

accessing an image depicting at least part of a biological sample, wherein the image is at a first image resolution;

accessing a machine-learning model trained to detect artifact pixels in images at a second image resolution, wherein the first image resolution has a higher image resolution relative to the second image resolution, wherein the machine-learning model is trained by:

accessing an image depicting at least part of a biological sample, applying an image pre-processing algorithm to the image to generate a pre-processed image, wherein the pre-processed image includes a plurality of labeled pixels, and wherein each labeled pixel of the plurality of labeled pixels is associated with a label predicting whether the pixel accurately depicts a corresponding point or region of the at least part of the biological sample, applying the machine-learning model to the pre-processed image to identify one or more labeled pixels from the plurality of labeled pixels, wherein the one or more labeled pixels are predicted to have been erroneously labeled by the image pre-processing algorithm, modifying a label of each of the one or more labeled pixels, generating a training image that includes at least the one or more labeled pixels with the modified labels, for each labeled pixel of the plurality of labeled pixels of the training image:

determining a first loss of the labeled pixel at a first image resolution by applying a first convolution layer of a set of convolutional layers to a first feature map representing the training image at the first image resolution, determining a second loss of the labeled pixel at the second image resolution by applying a second convolution layer of the set of convolutional layers to a second feature map representing the training image at a second image resolution, wherein the second image resolution has a higher image resolution relative to the first image resolution, determining a total loss for the labeled pixel based on the first loss and the second loss, and determining, based on the total loss, that the machine-learning model has been trained to detect one or more artifact pixels at a target image resolution; and converting the image to generate a converted image that depicts the at least part of the biological sample at the second image resolution;

applying the machine-learning model to the converted image to identify one or more artifact pixels from the converted image, wherein an artifact pixel of the one or more artifact pixels is predicted to not accurately depict a point or region of the at least part of the biological sample; and generating an output that includes the one or more artifact pixels.

15. The method of claim 14, further comprising:

applying a blur threshold to each labeled pixel of the plurality of labeled pixels;

determining, based on applying the blur threshold, that an additional labeled pixel of the plurality of labeled pixels has been erroneously labeled; and modifying a label corresponding to the additional labeled pixel.

16. The method of claim 15, wherein the blur threshold is determined based on performance of a downstream algorithm on a set of z-axis images depicting the at least part of a biological sample across a depth dimension.

17. The method of claim 14, further comprising:

converting the training image to a greyscale training image, wherein the machine-learning model is trained using the greyscale training image; and converting the plurality of labeled pixels of the training image from a first color space to a second color space to generate a modified training image, wherein the machine-learning model is trained using the modified training image.

18. The method of claim 14, wherein the output is an image mask that includes the one or more artifact pixels, the method further comprising:

overlaying the image mask on the image to distinguish a set of pixels in the image from the one or more artifact pixels; and applying a cell-classification model to the set of pixels.

19. The method of claim 14, wherein the output identifies a quantity of the one or more artifact pixels.

20. The method of claim 14, further comprising using the output to adjust one or more scanning parameters of a scanning device.

* * * * *